United States Patent
Calleija et al.

(10) Patent No.: US 11,760,319 B2
(45) Date of Patent: *Sep. 19, 2023

(54) BRAKE PRELOAD SYSTEM FOR AUTONOMOUS VEHICLES

(71) Applicant: UATC, LLC, San Francisco, CA (US)

(72) Inventors: Mark Calleija, San Mateo, CA (US); Eyal Cohen, San Francisco, CA (US); Kenneth James Jensen, Alameda, CA (US); Randol Aikin, San Francisco, CA (US); Brian Neil, San Francisco, CA (US)

(73) Assignee: UATC, LLC, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/653,101

(22) Filed: Mar. 1, 2022

(65) Prior Publication Data

US 2022/0185244 A1    Jun. 16, 2022

Related U.S. Application Data

(63) Continuation of application No. 16/210,967, filed on Dec. 5, 2018, now Pat. No. 11,285,927.

(Continued)

(51) Int. Cl.
*B60T 7/12* (2006.01)
*B60T 13/66* (2006.01)
(Continued)

(52) U.S. Cl.
CPC ............. *B60T 7/12* (2013.01); *B60T 8/174* (2013.01); *B60T 13/662* (2013.01); *B60T 13/686* (2013.01); *B60T 2201/12* (2013.01)

(58) Field of Classification Search
CPC .......... B60T 7/12; B60T 8/174; B60T 13/662; B60T 13/686; B60T 2201/12;
(Continued)

(56) References Cited

U.S. PATENT DOCUMENTS 5,983,161 A * 11/1999 Lemelson ............... G01S 19/11
340/436
6,278,928 B1  8/2001 Aruga et al.
(Continued)

OTHER PUBLICATIONS

U.S. Appl. No. 16/210,967, filed Dec. 5, 2018, Brake Preload System for Autonomous Vehicles.
(Continued)

*Primary Examiner* — Richard M Camby
(74) *Attorney, Agent, or Firm* — SCHWEGMAN LUNDBERG & WOESSNER, P.A.

(57) ABSTRACT

Vehicles according to at least some embodiments of the disclosure include a sensor, and a computing device comprising at least one hardware processing unit. The computing device is programmed to perform operations comprising capturing an image with the sensor, identifying an object in the image, and in response to an accuracy of the identification meeting a first criterion, pre-loading a braking system of the autonomous vehicle. In some aspects, the computing device may predict that an object not currently within a path of the vehicle has a probability of entering the path of the vehicle that meets a second criterion. When the probability of entering the path meets the second criterion, some of the disclosed embodiments may pre-load the braking system.

20 Claims, 12 Drawing Sheets

Related U.S. Application Data

(60) Provisional application No. 62/736,767, filed on Sep. 26, 2018.

(51) Int. Cl.
  *B60T 8/174* (2006.01)
  *B60T 13/68* (2006.01)

(58) Field of Classification Search
  CPC ........ B60T 2201/022; B60T 8/17; B60T 7/22;
                            G01S 13/931; G01S 17/931
  See application file for complete search history.

(56) References Cited

U.S. PATENT DOCUMENTS

| | | | |
|---|---|---|---|
| 6,405,132 B1* | 6/2002 | Breed | B60N 2/2863 |
| | | | 701/45 |
| 11,285,927 B2* | 3/2022 | Calleija | B60T 7/22 |
| 2009/0187322 A1 | 7/2009 | Yasui et al. | |
| 2014/0244130 A1 | 8/2014 | Filev et al. | |
| 2016/0046170 A1 | 2/2016 | Lu | |
| 2019/0329744 A1* | 10/2019 | Kim | B60T 13/662 |
| 2019/0366991 A1* | 12/2019 | Tsuchiya | B60T 7/12 |
| 2020/0094794 A1 | 3/2020 | Calleija et al. | |

OTHER PUBLICATIONS

"U.S. Appl. No. 16/210,967, Notice of Allowance dated Nov. 19, 2021", 8 pgs.

* cited by examiner

BRAKE PRELOAD SYSTEM FOR AUTONOMOUS VEHICLES

CROSS REFERENCE TO RELATED APPLICATIONS

This application is a continuation of U.S. application Ser. No. 16/210,967, filed Dec. 5, 2018, which claims priority to U.S. Provisional Application No. 62/736,767, filed Sep. 26, 2018 and entitled "BRAKE PRE-LOAD SYSTEM FOR AUTONOMOUS VEHICLES." The contents of each of which are considered part of this application, and are hereby incorporated by reference in their entireties.

FIELD

The document pertains generally, but not by way of limitation, to devices, systems, and methods for operating an autonomous vehicle. In particular, the disclosure relates to control of a braking system for an autonomous vehicle.

BACKGROUND

An autonomous vehicle is a vehicle that is capable of sensing its environment and operating some or all of the vehicle's controls based on the sensed environment. An autonomous vehicle includes sensors that capture signals describing the environment surrounding the vehicle. The autonomous vehicle processes the captured sensor signals to comprehend the environment and automatically operates some or all of the vehicle's controls based on the resulting information.

DRAWINGS

In the drawings, which are not necessarily drawn to scale, like numerals may describe similar components in different views. Like numerals having different letter suffixes may represent different instances of similar components. Some embodiments are illustrated by way of example, and not of limitation, in the figures of the accompanying drawings.

DETAILED DESCRIPTION

Figure 1:
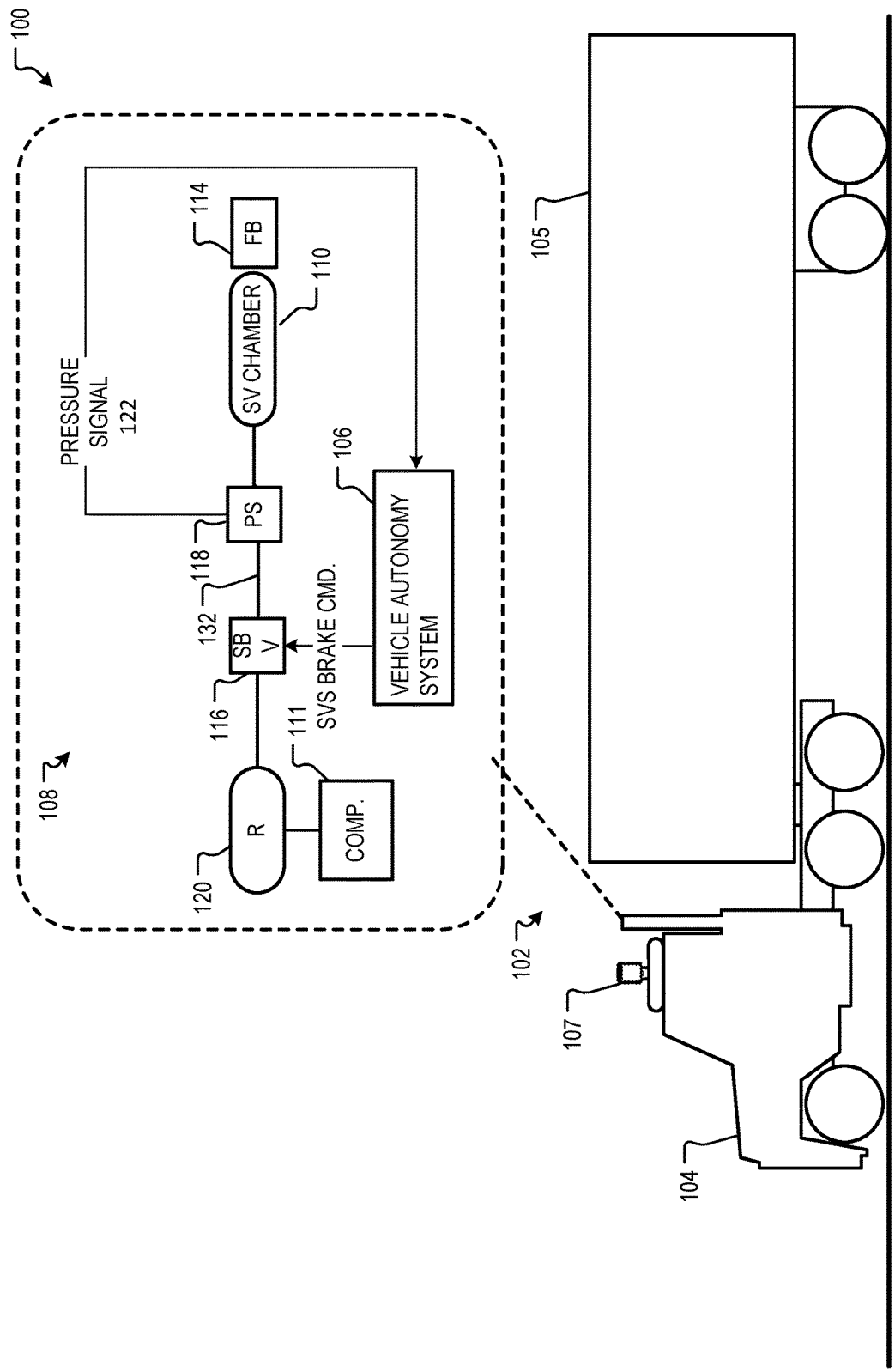
FIG. 1 is a diagram showing one example of an environment including a vehicle.

Examples described herein are directed to systems and methods for operating an AV. In an AV, a vehicle autonomy system controls one or more of the braking, steering, or throttle of the vehicle. An AV may be fully-autonomous or semi-autonomous. In a fully-autonomous vehicle, the vehicle autonomy system assumes full control of the vehicle. In a semi-autonomous vehicle, the vehicle autonomy system assumes a portion of the vehicle control, with a human user (e.g., a vehicle operator) still providing some control input.

Autonomous vehicles employ computer based perception systems to recognize objects within the environment of the autonomous vehicle. The perception system then predicts the future actions of the detected objects, which are inputted into the autonomous vehicle's motion planner. In turn, the motion planner calculates a planned trajectory for the autonomous vehicle that maintains safe vehicle operation.

Depending on a number of factors, objects may be recognized by the perception system at a variety of confidence or accuracy levels. For example, objects may be more difficult to detect, recognize, and/or predict at farther distances. In some situations, the perception system may identify the presence of an object, but may be unable to determine a type of the object at a particular level of accuracy. Furthermore, the perception system may erroneously identify an object when there is no actual object due to spurious sensor noise. In other situations, the perception system may be able to determine the type of object accurately but unable to predict the object's future action at a particular level of accuracy. To ensure safe vehicle operation, the AV may apply the brakes in response to it detecting an object with low accuracy because the perception system may assume the worst-case scenario. If the object does not actually present a threat to safe operation (e.g., there is no actual object, the object is harmless (e.g., a plastic bag or a leaf blowing in the wind), or the object is behaving in a way that does not interfere with the motion plan (e.g., the object is at a safe distance and is traveling away from the autonomous vehicle faster than the autonomous vehicle is traveling) the brakes may be applied unnecessarily, which may reduce ride comfort and/or safety.

The disclosed embodiments reduce the occurrences of undesirable behaviors by the autonomous vehicle due to perception inaccuracies (e.g., detection, identification, and/or prediction) while still ensuring safe operation in the event the autonomous vehicle should engage its brakes. This is accomplished by the autonomous vehicle pre-loading the braking system of the vehicle in response to a perception accuracy level not satisfying a predetermined criterion (such as meeting a threshold level of confidence). Pre-loading the braking system prepares for braking, if necessary, while providing the perception system with additional time to improve the accuracy of the object's perception before actually engaging the braking system. While the perception system is improving the accuracy of recognition, the vehicle continues to travel along its motion plan as long as it is capable of stopping before a possible collision. Because of the pre-loading, a reduced braking distance is required if the perception system is not able to resolve the perception accuracy or if the object is later recognized as a legitimate threat to vehicle safety. Pre-loading of the braking system allows the autonomous vehicle to maintain safe operation in this situation by reducing a braking distance required after a decision to apply a braking force is made. It may not be desirable to maintain the braking system in a constant state of pre-loading. For example, a pre-loaded braking system may experience greater wear, noise, energy consumption or other undesirable effects when compared to a braking system in a quiescent or not pre-loaded state.

In embodiments that utilize an air-based braking system, pre-loading the brakes may include partially pressurizing one or more braking chambers to a pressure insufficient to exert a braking force on the vehicle, but sufficient to reduce a delay in reaching a braking pressure when application of a braking force is called for. Pre-loading the braking system provides for more immediate application of stopping force to the vehicle upon reception of a braking signal, as compared to a system that pre-loads after reception of the signal. In some scenarios, pre-loading the brakes can reduce stopping distance by approximately thirty (30) feet when stopping from 60 miles per hour (MPH).

In an example embodiment, the motion planner monitors the current level of brake pre-loading to determine the stopping time (or stopping distance) the autonomous vehicle requires at the given level. For example, higher levels of pre-loading results in less stopping time. Based on the determined stopping time, the motion planner is configured to trigger engagement of the brakes to ensure that the autonomous vehicle does not collide with the object.

During the additional time made available via the pre-loading of the braking system, the perception system may perform a variety of operations to increase accuracy of object recognition. For example, the perception system may use the additional time to perform additional scans or sweeps of a vehicle path using imaging and/or ranging sensors. By utilizing data from multiple sensors and/or multiple sweeps by a single sensor, noise may be reduced from an object recognition pipeline of the perception system, with any objects still recognized after the multiple data sources having a higher recognition confidence or accuracy.

The perception system may also use the additional time to refine a classification of objects detected in data from one or more sensors. For example, in some embodiments, the perception system may determine a set of probabilities that an object is any one object type in a corresponding set of object types. For example, the perception system may compute a first probability that the object is a pedestrian, and a second probability that the object is a plastic bag. In some cases, available sensor data may be providing a relatively low resolution of an object, such that both the first and second probabilities are relatively low. This may result in the probabilities generated by the perception system being too low to recognize an object with a sufficient level of accuracy. Applying brakes with the existing level of accuracy may result in a false positive, for example, if the object turns out to not be a pedestrian but instead is later recognized by the perception system, after the brakes have been applied, as a paper bag. These same probabilities may not be too low however to justify pre-loading the braking system. While the brakes are pre-loaded, and as a result of a collection of additional sensor data with additional time for analysis of the data, the perception system may recompute the probabilities. The recomputed probabilities may reflect an increased level of recognition accuracy, providing for a decision to either ignore the object (e.g., noise or recognized as an object that does not present a risk of vehicle safety) or apply a braking force.

In example embodiments, maintaining the pre-load in the system occurs for short bursts upon low confidence detections, with little to no effect on the nominal cruising speed of the autonomous vehicle. There are a number of ways that the pre-load level is maintained without slowing down the vehicle or applying the brakes with excessive stopping force. These may include: a) pressure based pre-load control (e.g. fluid pressure such as air or liquid (e.g. brake fluid/oil)), or mechanical pressure (i.e. force/area)); b) closed loop motion based pre-load control (e.g. velocity, acceleration of the vehicle); c) electrical resistivity sensing based pre-load control (e.g. resistance between pads to rotors or shoes to drums); and/or d) time based pre-load control (e.g. decision to brake/not brake to be made within pre-load time). There can be constraints on the maximum rate of pre-load triggering as well as the maximum duration for maintaining the pre-load while waiting for a high confidence detection decision.

In example embodiments, while in the pre-loading state, nominally the throttle would be off and the vehicle would maintain approximately constant velocity. However, depending on how finely the pre-load can be controlled and characterized as well as the throttle responsiveness, some embodiments may continue normal operation of the throttle during brake pre-load stage to reduce system disruptions in false-positive instances. The brake lights may be illuminated on or off with similar thresholding logic as the throttle.

FIG. 1 is a diagram showing one example of an environment 100 including a vehicle 102. The vehicle 102, in some examples, is a self-driving vehicle (SDV) or AV comprising a vehicle autonomy system 106 for operating the vehicle without human intervention. In some examples, the vehicle 102 also, in addition to or instead of a fully-autonomous mode, includes a semi-autonomous mode in which a human user is responsible for some or all control of the vehicle.

In the example of FIG. 1, the vehicle 102 is a tractor-trailer including a tractor 104 and a trailer 105. In various other examples, the vehicle 102 does not include a trailer and may be, for example, a dump truck, a bus, or any other similar vehicle. Also, in some examples, the vehicle 102 is a passenger vehicle or other suitable type of vehicle.

The vehicle 102 has one or more remote detection sensors 107 that receive return signals from the environment 100. Return signals may be reflected from objects in the environment 100, such as the ground, buildings, and trees. The remote detection sensors 107 may include one or more active sensors, such as light detection and ranging (LIDAR), radio detection and ranging (RADAR), or sound navigation and ranging (SONAR) that emit sound or electromagnetic radiation in the form of light or radio waves to generate return signals. The remote detection sensors 107 may also include one or more active sensors, such as cameras or other imaging sensors and proximity sensors. Information about the environment 100 is extracted from the return signals. In some examples, the remote detection sensors 107 include a passive sensor that receives reflected ambient light or other radiation, such as a set of stereoscopic cameras.

The example of FIG. 1 shows the vehicle autonomy system 106 and part of a braking system 108 for the vehicle 102. The vehicle autonomy system 106 is configured to receive signals from the remote detection sensors 107 and determine a set of vehicle actions. For example, the vehicle autonomy system 106 may include a perception system, a prediction system, a motion planning system, and/or a pose system, described in more detail with respect to FIG. 2A. The vehicle autonomy system 106 also includes one or more controllers that are electrically or otherwise connected to control interfaces for various vehicle controls, described in more detail herein.

The braking system 108 includes a service brake chamber 110. In the example of FIG. 1, the braking system 108 also includes a foundation brake 114. The foundation brake 114 includes a mechanism positioned at the wheels or axles of the vehicle 102 to slow or stop the vehicle 102. In some examples, the service brake chamber 110 engages the foundation brake 114.

Although one service brake chamber 110, and one foundation brake 114 are shown in FIG. 1, the vehicle 102 may have multiple instances of each. For example, service brake chambers similar to the service brake chamber 110 and foundation brakes similar to foundation brake 114 may be positioned at some or all wheels of the vehicle 102.

The braking system 108 also includes a compressor 111 that generates pressurized air and a pressurized air reservoir 120 to hold the pressurized air. The service brake chamber 110 is in fluid communication with the pressurized air reservoir 120 (also referred to as "reservoir 120") via a service brake line 131. A service brake valve 116 on the service brake line 131 controls a flow of pressurized air from the reservoir 120 to the service brake chamber 110. The service brake valve 116 is responsive to service brake commands received from the vehicle autonomy system 106 to modulate the flow of pressurized air from the reservoir 120 to the service brake chamber. An optional pressure sensor 118 is also shown. The pressure sensor 118 is responsive to the pressure in the service brake line 132 to generate a pressure signal 122 that is provided to the vehicle autonomy system 106. In some examples, the pressure signal 122 is also used to disable the vehicle autonomy system, for example, by disconnecting it from vehicle controls, as described herein.

Figure 2A:
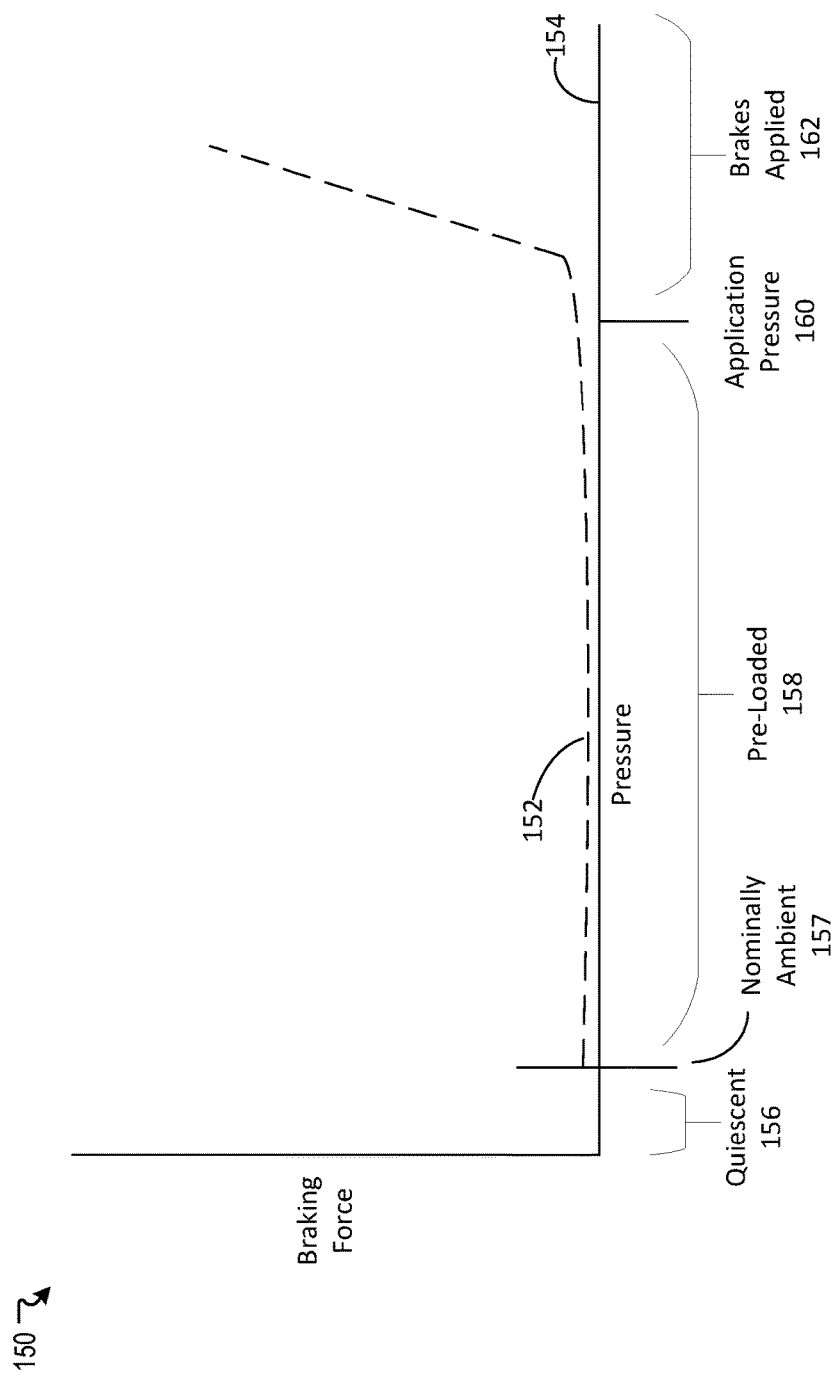
FIG. 2A is a graph illustrating the three states in at least some of the disclosed embodiments.

The braking system 108 may be configured to operate in at least three states. FIG. 2A is a graph 150 illustrating the three states in at least some of the disclosed embodiments, and how the three states relate to a braking pressure 154 within a braking system. FIG. 2A shows a first state or quiescent state 156 below a nominally ambient pressure 157. The braking system exists in the first state when the braking system is at a very low or ambient pressure. In this first state 156, there is essentially no pressure between friction surfaces of the braking system. There is also little or no pressure against seals or other components within the braking system. The compressor 111 may also be unpowered when the braking system is in this first state, as the system 108 is not working to maintain any pressure above ambient 157 in the braking system 108. A second state of the braking system is a pre-loaded state 158. In the pre-loaded state 158, a pressure of the braking system as shown by the axis or line 152 is maintained above an ambient pressure 157 but below a brake application pressure 160. Note that a pressure within the braking system 108 when in the second state may encompass any pressure within the range of pressures represented by pre-loaded state 158 in graph 150. As discussed above, the brake application pressure 160 is a pressure where friction surfaces of the braking system become effectively engaged to begin to exert a non-di-minimis braking force against motion of the AV. Because the pressure within the braking system is above ambient pressure when in the pre-loaded state 158, some wear to friction surfaces, seals, hoses, and other brake system components may be experienced in this state. In some embodiments, rear brake lights may illuminate when the braking system is in the pre-loaded state 158. However, no substantial braking force is applied to the vehicle when the braking system operates in the second or pre-loaded state. In a third state 162, braking force is applied by the braking system. Note that the third state 162 may encompass a range of pressures within the braking system. The pressure within the braking system may vary the amount of braking force applied in the third state 162, with heavy braking requiring more pressure than light braking.

Figure 2B:
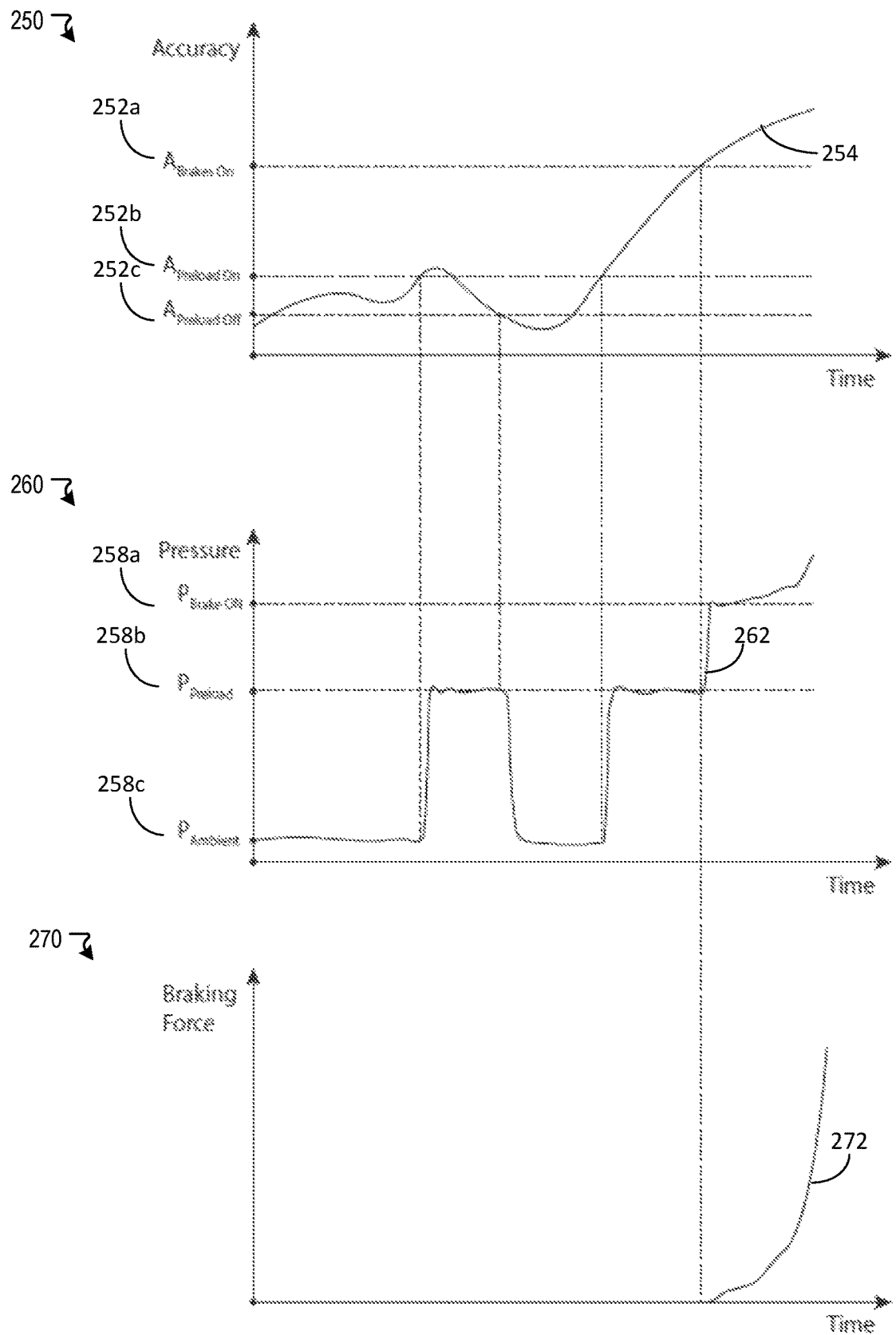
FIG. 2B shows three graphs illustrating recognition accuracy, pressure, and braking force aligned along a shared time axis.

FIG. 2B shows three graphs illustrating recognition accuracy of an object in a vehicle path, pressure within a braking system of the vehicle, and applied braking force to the vehicle respectively. Each graph is aligned along a shared time axis. An accuracy graph 250 includes three thresholds 252a-c. A first threshold 252a indicates a level of recognition accuracy of the object 254 that causes the brakes to be applied on the vehicle. In other words, if the recognition accuracy level 254 is above the threshold 252a, a braking force is applied to the vehicle. Threshold 252b indicates a level of recognition accuracy that causes a braking system of the vehicle to be pre-loaded, as discussed above. Thus, if the accuracy level falls between the threshold 252b and the threshold 252a, the brakes are pre-loaded, and if the recognition accuracy level is above the threshold 252a, the brakes are applied. Graph 250 also shows a threshold 252c, which indicates an accuracy level below which, the braking system is transitioned from a pre-loaded state to a quiescent or pre-load off state. The braking system may also be transitioned from a pre-loaded state to a quiescent state after a threshold period of time in the pre-loaded state in some aspects. Graph 250 shows that there is a region below the threshold 252b and above the threshold 252c. Thus, in embodiments implemented according to graph 250, a braking system placed in a pre-loaded state based on the threshold 252, is not removed from the pre-loaded state when the recognition accuracy 254 drops below the threshold 252b. Instead, the recognition accuracy 254 needs to drop below the threshold 252c before the braking system will be transitioned from the pre-loaded state to a quiescent state. A system according to such an implementation may be described as including a hysteresis. Hysteresis methods may be used to control one or more of the pre-loading of the braking system and/or application of a braking force, as described below with respect to graph 270.

Graph 260 shows three thresholds 258a-c that are compared to a pressure 262 within the braking system. Threshold 258c represents an ambient pressure within the braking system. Threshold 258b represents a pressure that is present in the braking system when the braking system is in the pre-loaded state. Threshold 258a represents a pressure within the braking system, above which causes a braking force to be being applied to the vehicle.

Graph 270 shows braking force 272 applied to the vehicle. The combination of graphs 260 and 270, which share equivalent time axis, demonstrate that when the pressure 262 rises above the threshold 258a, the braking force 272 becomes non-zero, and increases as the pressure 262 increases.

Figure 3:
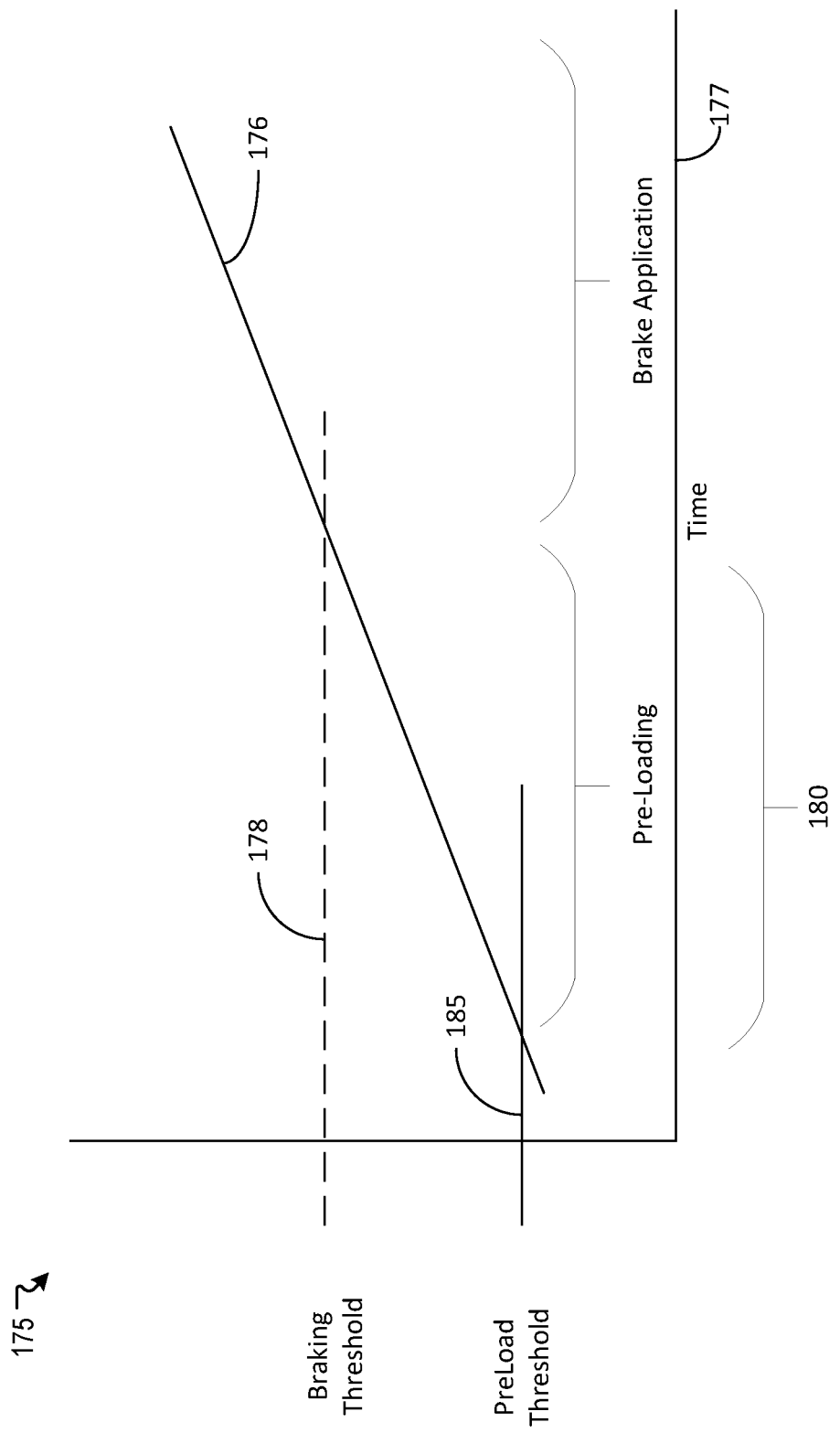
FIG. 3 is a graph showing a level of object recognition accuracy over time in one example embodiment.

FIG. 3 is a graph 175 showing an example level of an object's recognition accuracy 176 over time in one embodiment. The recognition accuracy 176 may be an accuracy computed by the perception system of an autonomous vehicle. In some aspects, the recognition accuracy 176 may represent a highest probability determination that a detected object is a particular type of object. As discussed above, in some aspects, the perception system 203 may be configured to compute a set of probabilities for a detected object, with each representing a probability that the detected object is of a particular object type. A highest probability of these probabilities may be said to indicate that the object is "recognized" as the type of object associated with the highest probability. Other methods of computing a recognition accuracy are also contemplated.

The recognition accuracy 176 may increase over time 177. For example, the perception system 203 may receive additional sensor data over time that enables an increase (or decrease) in the object's recognition accuracy. During a first portion of the graph 175, the recognition accuracy 176 is above a pre-load threshold 185 but below a braking threshold 178. Since the accuracy is below the threshold 178, the brakes may be pre-loaded to prepare the braking system for application, while also providing the perception system 203 with additional time 180 to increase the recognition accuracy 176. Once the recognition accuracy 176 rises above the braking threshold 178, the perception system 203 is better able to distinguish between objects that represent a legitimate threat to safety, such as a recognition of the object as a pedestrian, bicyclist, or even an animal such as a deer or a squirrel, and other objects that do not represent a threat to safety, such as a leaf or plastic bag. If the object is one that represents a threat, the brakes may be applied. In other words, a stopping force is applied to an autonomous vehicle by application of the brakes.

Figure 4:
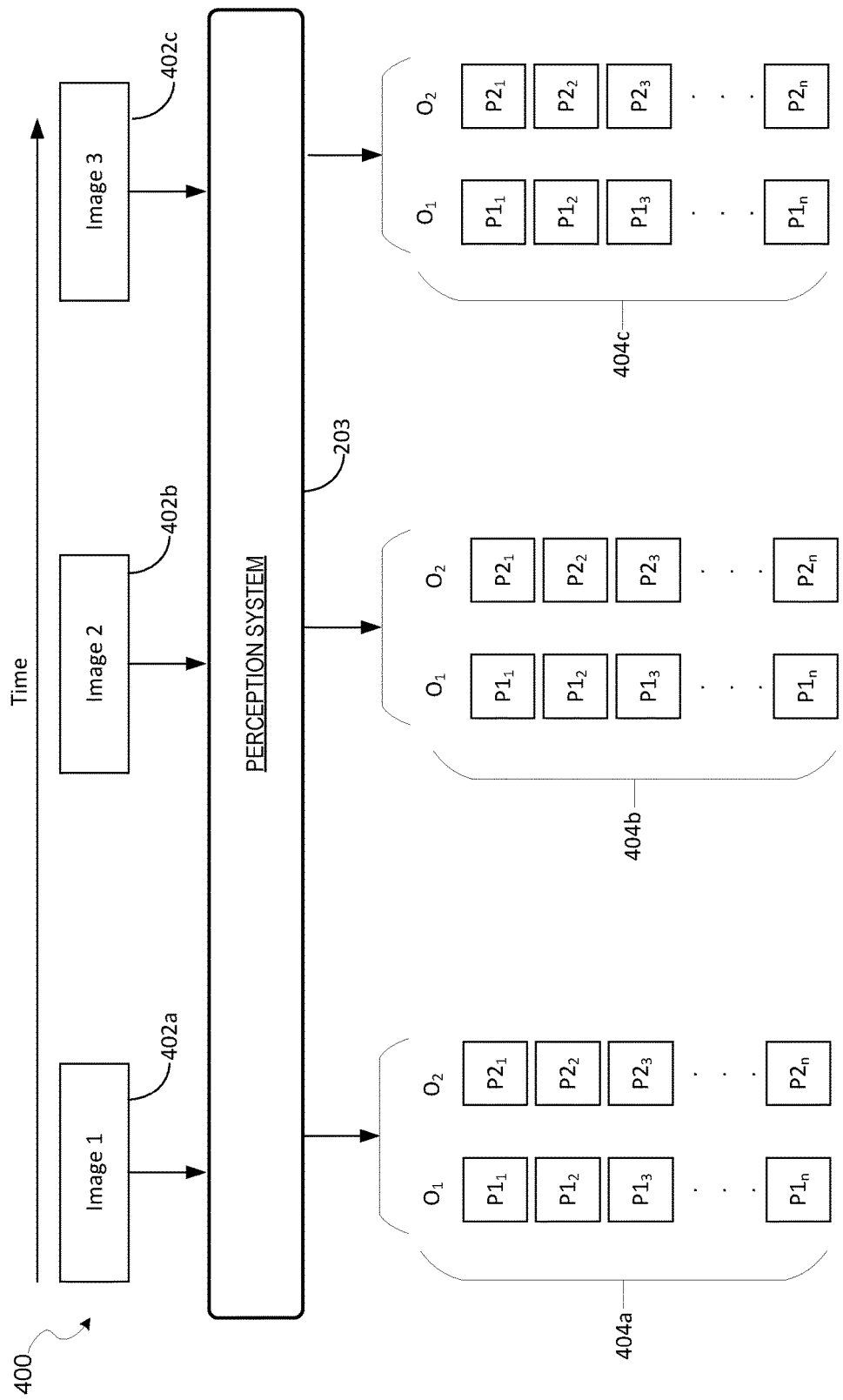
FIG. 4 shows an example data flow that may be implemented in at least some of the disclosed embodiments.

FIG. 4 illustrates a data flow that may be implemented in at least some of the disclosed embodiments. The data flow 400 of FIG. 4 shows a perception system 203 receiving three different images 402a-c over a period of time. The images may be comprised of data collected via at least one or more of visual imaging, infrared imaging, RADAR imaging, or LIDAR imaging. Any imaging technology that provides for remote detection sensing of an environment may be used.

Each of the images 402a-c may or may not represent a first object $O_1$ and a second object $O_2$. FIG. 4 shows the perception system receiving data from a first image 402a. The perception system may, based on at least the first image 402, calculate a first set of probabilities 404a. The probabilities 404a include probabilities that the first object $O_1$ is each object type in a set of object types. These probabilities are represented in FIG. 4 as $P1_1 \ldots P1_n$. The perception system 203 may also, based on at least the first image 402, calculate probabilities that the second object $O_2$ is each object type in a set of object types. These probabilities are shown as $P2_1 \ldots P2_n$.

At some later time, a second image 402b is provided to the perception system 203. Based at least on the first image 402a and the second image 402b, the perception system 203 calculates a second set of probabilities 404b. The second set of probabilities 404b includes updated probabilities $P1_1 \ldots P1_n$ and $P2_1 \ldots P2_n$.

At a further later time, a third image 402c is provided to the perception system 203. Based at least on the first image 402a, second image 402b, and third image 402c, the perception system 203 may generate a third set of probabilities 404c, including updated values for probabilities $P1_1 \ldots P1_n$ and $P2_1 \ldots P2_n$. An accuracy of each of the probabilities $P1_1 \ldots P1_n$ and $P2_1 \ldots P2_n$ within each of the sets of probabilities 404a-c may be used to determine whether to pre-load a braking system of an autonomous vehicle and/or apply a braking force to the autonomous vehicle, as discussed throughout this disclosure.

Figure 5:
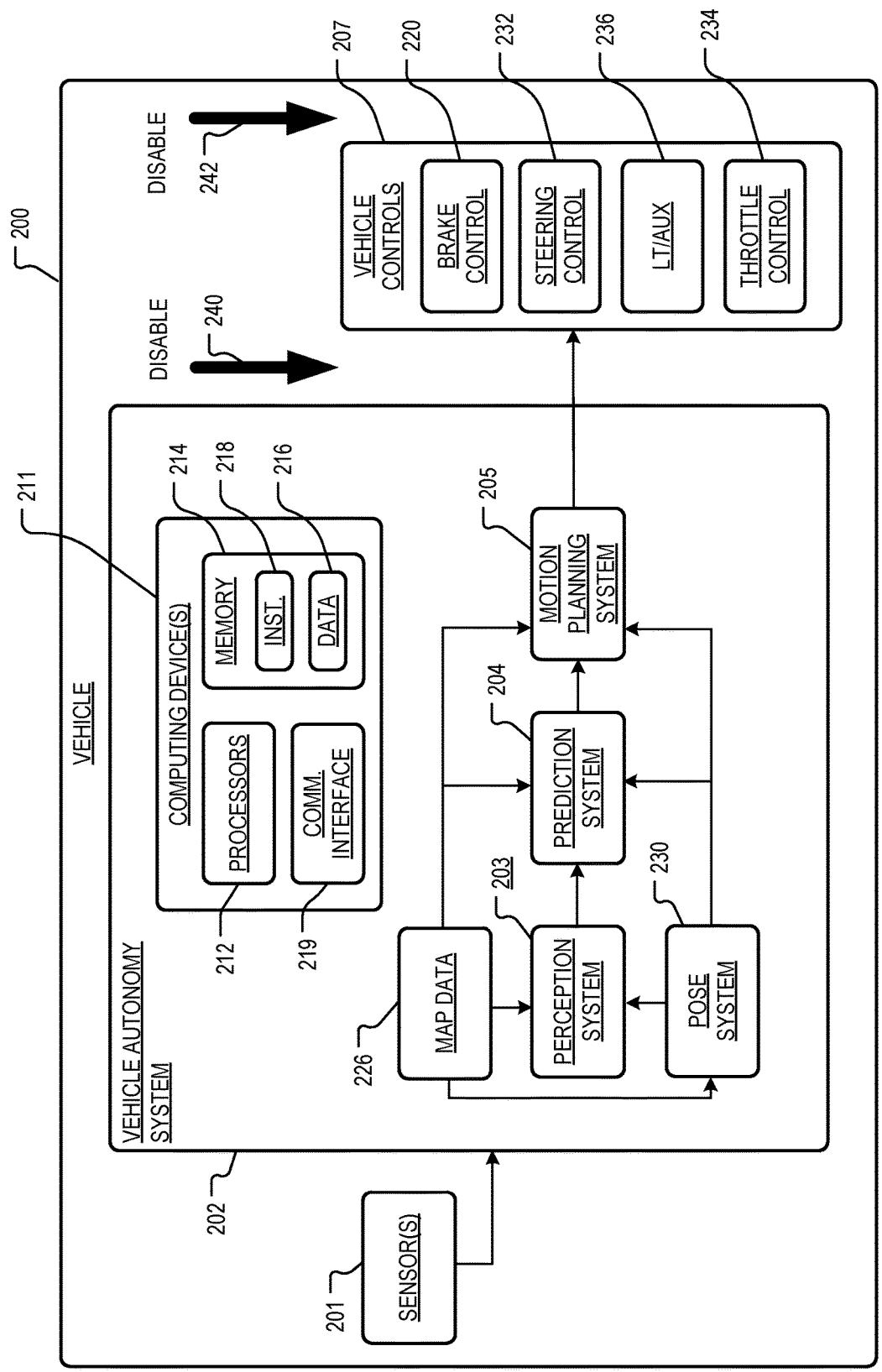
FIG. 5 depicts a block diagram of an example vehicle according to example aspects of the present disclosure.

FIG. 5 depicts a block diagram of an example vehicle 200 according to example aspects of the present disclosure. The vehicle 200 can be, for example, an AV. The vehicle 200 includes one or more sensors 201, a vehicle autonomy system 202, and one or more vehicle controls 207.

The vehicle autonomy system 202 can be engaged to control the vehicle 200 or to assist in controlling the vehicle 200. In particular, the vehicle autonomy system 202 receives sensor data from the one or more sensors 201, attempts to comprehend the environment surrounding the vehicle 200 by performing various processing techniques on data collected by the sensors 201, and generates an appropriate motion path through the environment. The vehicle autonomy system 202 can control the one or more vehicle controls 207 to operate the vehicle 200 according to the motion path.

The vehicle autonomy system 202 includes a perception system 203, a prediction system 204, a motion planning system 205, and a pose system 230 that cooperate to perceive the surrounding environment of the vehicle 200 and determine a motion plan for controlling the motion of the vehicle 200 accordingly. The pose system 230 may be arranged to operate as described herein.

Various portions of the vehicle autonomy system 202 receive sensor data from the one or more sensors 201. For example, the sensors 201 may include remote detection sensors as well as motion sensors such as an inertial measurement unit (IMU), one or more encoders, or one or more odometers. The sensor data can include information that describes the location of objects within the surrounding environment of the vehicle 200, information that describes the motion of the vehicle, and so forth.

The sensors 201 may also include one or more remote detection sensors or sensor systems, such as a LIDAR, a RADAR, or one or more cameras. As one example, a LIDAR system of the one or more sensors 201 generates sensor data (e.g., remote detection sensor data) that includes the location (e.g., in three-dimensional space relative to the LIDAR system) of a number of points that correspond to objects that have reflected a ranging laser. For example, the LIDAR system can measure distances by measuring the Time of Flight (TOF) that it takes a short laser pulse to travel from the sensor to an object and back, calculating the distance from the known speed of light.

As another example, a RADAR system of the one or more sensors 201 generates sensor data (e.g., remote detection sensor data) that includes the location (e.g., in three-dimensional space relative to the RADAR system) of a number of points that correspond to objects that have reflected ranging radio waves. For example, radio waves (e.g., pulsed or continuous) transmitted by the RADAR system can reflect off an object and return to a receiver of the RADAR system, giving information about the object's location and speed. Thus, a RADAR system can provide useful information about the speed of an object.

As yet another example, one or more cameras of the one or more sensors 201 may generate sensor data (e.g., remote detection sensor data) including still or moving images. Various processing techniques (e.g., range imaging techniques such as structure from motion, structured light, stereo triangulation, and/or other techniques) can be performed to identify the location (e.g., in three-dimensional space relative to the one or more cameras) of a number of points that correspond to objects that are depicted in image or images captured by the one or more cameras. Other sensor systems can identify the location of points that correspond to objects as well.

As another example, the one or more sensors 201 can include a positioning system. The positioning system can determine a current position of the vehicle 200. The positioning system can be any device or circuitry for analyzing the position of the vehicle 200. For example, the positioning system can determine a position by using one or more of inertial sensors, a satellite positioning system such as a Global Positioning System (GPS), based on IP address, by using triangulation and/or proximity to network access points or other network components (e.g., cellular towers, WiFi access points, etc.), or other suitable techniques. The position of the vehicle 200 can be used by various systems of the vehicle autonomy system 202.

Thus, the one or more sensors 201 can be used to collect sensor data that includes information that describes the location (e.g., in three-dimensional space relative to the vehicle 200) of points that correspond to objects within the surrounding environment of the vehicle 200. In some implementations, the sensors 201 can be located at various different locations on the vehicle 200. As an example, in some implementations, one or more cameras and/or LIDAR sensors can be located in a pod or other structure that is mounted on a roof of the vehicle 200 while one or more RADAR sensors can be located in or behind the front and/or rear bumper(s) or body panel(s) of the vehicle 200. As another example, camera(s) can be located at the front or rear bumper(s) of the vehicle 200. Other locations can be used as well.

The pose system 230 receives some or all of the sensor data from sensors 201 and generates vehicle poses for the vehicle 200. A vehicle pose describes a position and attitude of the vehicle. The position of the vehicle 200 is a point in a three dimensional space. In some examples, the position is described by values for a set of Cartesian coordinates, although any other suitable coordinate system may be used. The attitude of the vehicle 200 generally describes the way in which the vehicle 200 is oriented at its position. In some examples, attitude is described by a yaw about the vertical axis, a pitch about a first horizontal axis, and a roll about a second horizontal axis. In some examples, the pose system 230 generates vehicle poses periodically (e.g., every second, every half second) The pose system appends time stamps to vehicle poses, where the time stamp for a pose indicates the point in time that is described by the pose. The pose system 230 generates vehicle poses by comparing sensor data to map data 226 describing the surrounding environment of the vehicle 200. The pose system 230, in some examples, comprises one or more localizers and a pose filter. Localizers generate pose estimates based on remote-sensing data. The pose filter generates vehicle poses based on pose estimates generated by one or more localizers and on motion sensor data, for example, from an inertial measurement unit (IMU), odometers, or other encoders.

The perception system 203 detects objects in the surrounding environment of the vehicle 200 based on sensor data, map data 226, and/or vehicle poses provided by the pose system 230. Map data 226, for example, may provide detailed information about the surrounding environment of the vehicle 200. The map data 226 can provide information regarding: an identity and location of different roadways, segments of roadways, buildings, or other items or objects (e.g., lampposts, crosswalks, curbing); the location and directions of traffic lanes (e.g., the location and direction of a parking lane, a turning lane, a bicycle lane, or other lanes within a particular roadway); traffic control data (e.g., the location and instructions of signage, traffic lights, or other traffic control devices); and/or any other map data that provides information that assists the vehicle autonomy system 202 in comprehending and perceiving its surrounding environment and its relationship thereto. A roadway is a place where the vehicle can drive and may include, for example, a road, a street, a highway, a lane, a parking lot, or a driveway. The perception system 203 may utilize vehicle poses provided by the pose system 230 to place the vehicle 200 within the map data and thereby predict which objects should be in the vehicle's surrounding environment.

In some examples, the perception system 203 determines state data for one or more of the objects in the surrounding environment of the vehicle 200. State data describes a current state of an object (also referred to as features of the object). The state data for each object describes, for example, an estimate of the object's: current location (also referred to as position); current speed (also referred to as velocity); acceleration; current heading; current orientation; size/shape/footprint (e.g., as represented by a bounding shape such as a bounding polygon or polyhedron); type/class (e.g., vehicle versus pedestrian versus bicycle versus other); yaw rate; distance from the vehicle 200; minimum path to interaction with the vehicle 200; minimum time duration to interaction with the vehicle 200; and/or other state information.

In some implementations, the perception system 203 determines state data for each object over a number of iterations. In particular, the perception system 203 updates the state data for each object at each iteration. Thus, the perception system 203 detects and tracks objects, such as vehicles, that are proximate to the vehicle 200 over time.

The prediction system 204 is configured to predict one or more future positions for an object or objects in the environment surrounding the vehicle 200 (e.g., an object or objects detected by the perception system 203). The prediction system 204 can generate prediction data associated with one or more of the objects detected by the perception system 203. In some embodiments, the prediction system 204 generates prediction data describing each of the respective objects detected by the perspective system 204.

Prediction data for an object can be indicative of one or more predicted future locations of the object. For example, the prediction system 204 may predict where the object will be located within the next 5 seconds, 20 seconds, 200 seconds, and so forth. Prediction data for an object may indicate a predicted trajectory (e.g., predicted path) for the object within the surrounding environment of the vehicle 200. For example, the predicted trajectory (e.g., path) can indicate a path along which the respective object is predicted to travel over time (and/or the speed at which the object is predicted to travel along the predicted path). The prediction system 204 generates prediction data for an object, for example, based on state data generated by the perception system 203. In some examples, the prediction system 204 also considers one or more vehicle poses generated by the pose system 230 and/or map data 226.

In some examples, the prediction system 204 uses state data indicative of an object type or classification to predict a trajectory for the object. As an example, the prediction system 204 can use state data provided by the perception system 203 to determine that a particular object (e.g., an object classified as a vehicle) approaching an intersection and maneuvering into a left-turn lane intends to turn left. In such a situation, the prediction system 204 can predict a trajectory (e.g., path) corresponding to a left-turn for the vehicle such that the vehicle turns left at the intersection. Similarly, the prediction system 204 can determine predicted trajectories for other objects, such as bicycles, pedestrians, or parked vehicles. The prediction system 204 can provide the predicted trajectories associated with the object(s) to the motion planning system 205.

In some implementations, the prediction system 204 is a goal-oriented prediction system 204 that generates one or more potential goals, selects one or more of the most likely potential goals, and develops one or more trajectories by which the object can achieve the one or more selected goals. For example, the prediction system 204 can include a scenario generation system that generates and/or scores the one or more goals for an object and a scenario development system that determines the one or more trajectories by which the object can achieve the goals. In some implementations, the prediction system 204 can include a machine-learned goal-scoring model, a machine-learned trajectory development model, and/or other machine-learned models.

The motion planning system 205 determines a motion plan for the vehicle 200 based at least in part on the predicted trajectories associated with the objects within the surrounding environment of the vehicle, the state data for the objects provided by the perception system 203, vehicle poses provided by the pose system 230, and/or map data 226. Stated differently, given information about the current locations of objects and/or predicted trajectories of objects within the surrounding environment of the vehicle 200, the motion planning system 205 can determine a motion plan for the vehicle 200 that best navigates the vehicle 200 relative to the objects at such locations and their predicted trajectories on acceptable roadways.

In some implementations, the motion planning system 205 can evaluate one or more cost functions or one or more reward functions for each of one or more candidate motion plans for the vehicle 200. For example, the cost function(s) can describe a cost (e.g., over time) of adhering to a particular candidate motion plan while the reward function(s) can describe a reward for adhering to the particular candidate motion plan. For example, the reward can be of opposite sign to the cost.

Thus, given information about the current locations and/or predicted future locations/trajectories of objects, the motion planning system 205 can determine a total cost (e.g., a sum of the cost(s) and/or reward(s) provided by the cost function(s) and/or reward function(s)) of adhering to a particular candidate pathway. The motion planning system 205 can select or determine a motion plan for the vehicle 200 based at least in part on the cost function(s) and the reward function(s). For example, the motion plan that minimizes the total cost can be selected or otherwise determined. The motion plan can be, for example, a path along which the vehicle 200 will travel in one or more forthcoming time periods. In some examples, the motion plan also includes a speed path and/or an acceleration path for the vehicle 200. In some implementations, the motion planning system 205 can be configured to iteratively update the motion plan for the vehicle 200 as new sensor data is obtained from one or more sensors 201. For example, as new sensor data is obtained from one or more sensors 201, the sensor data can be analyzed by the perception system 203, the prediction system 204, and the motion planning system 205 to determine the motion plan.

Each of the perception system 203, the prediction system 204, the motion planning system 205, and the pose system 230, can be included in or otherwise be a part of a vehicle autonomy system configured to determine a motion plan based at least in part on data obtained from one or more sensors 201. For example, data obtained by one or more sensors 201 can be analyzed by each of the perception system 203, the prediction system 204, and the motion planning system 205 in a consecutive fashion in order to develop the motion plan. While FIG. 5 depicts elements suitable for use in a vehicle autonomy system according to example aspects of the present disclosure, one of ordinary skill in the art will recognize that other vehicle autonomy systems can be configured to determine a motion plan for an autonomous vehicle based on sensor data.

The motion planning system 205 can provide the motion plan to one or more vehicle controllers 207 to execute the motion plan. For example, the one or more vehicle controllers 207 can include a throttle controller 234, a brake controller 220, a steering controller 232, and other controllers, each of which is in communication with one or more vehicle control interfaces to control the motion of the vehicle 200.

The brake controller 220 is configured to receive all or part of the motion plan and generate a braking command that applies (or does not apply) the vehicle brakes. For example, the brake controller 220 sends a command to a braking interface. In some examples, the brake controller 220 includes a primary system and a secondary system. The primary system receives braking commands and, in response, brakes the vehicle 200. The secondary system may be configured to determine a failure of the primary system to brake the vehicle 200 in response to receiving the braking command.

The steering controller 232 is configured to receive all or part of the motion plan and generate a steering command. The steering command is provided to a steering interface, to provide a steering input to steer the vehicle 200.

A lighting/auxiliary controller 236 receives a lighting or auxiliary command. In response, the lighting/auxiliary controller 236 controls a lighting and/or auxiliary system of the vehicle 200. Controlling a lighting system may include, for example, turning on, turning off, or otherwise modulating headlights, parking lights, running lights, etc. Controlling an auxiliary system may include, for example, modulating windshield wipers, a defroster, etc. A throttle controller 234 is configured to receive all or part of the motion plan and generate a throttle command. The throttle command is provided to a throttle interface to control the engine or other propulsion system of the vehicle 200.

The vehicle autonomy system 202 includes one or more computing devices, such as the computing device 211, which may implement all or parts of the perception system 203, the prediction system 204, the motion planning system 205, and/or the pose system 230. The example computing device 211 can include one or more processors 212 and one or more memory devices (collectively referred to as memory) 214. The one or more processors 212 can be any suitable processing device (e.g., a processor core, a microprocessor, an Application Specific Integrated Circuit (ASIC), a Field Programmable Gate Array (FPGA), a microcontroller) and can be one processor or a plurality of processors that are operatively connected. The memory 214 can include one or more non-transitory computer-readable storage mediums, such as Random Access Memory (RAM), Read Only Memory (ROM), Electrically Erasable Programmable Read Only Memory (EEPROM), Erasable Programmable Read Only Memory (EPROM), flash memory devices, magnetic disks, and combinations thereof. The memory 214 can store data 216 and instructions 218 which can be executed by the processor 212 to cause the vehicle autonomy system 202 to perform operations. The one or more computing devices 211 can also include a communication interface 219, which allows the one or more computing devices 211 to communicate with other components of the vehicle 200 or external computing systems, such as via one or more wired or wireless networks. Additional descriptions of hardware and software configurations for computing devices, such as the computing device(s) 211 are provided herein at FIGS. 9 and 10.

Figure 6:
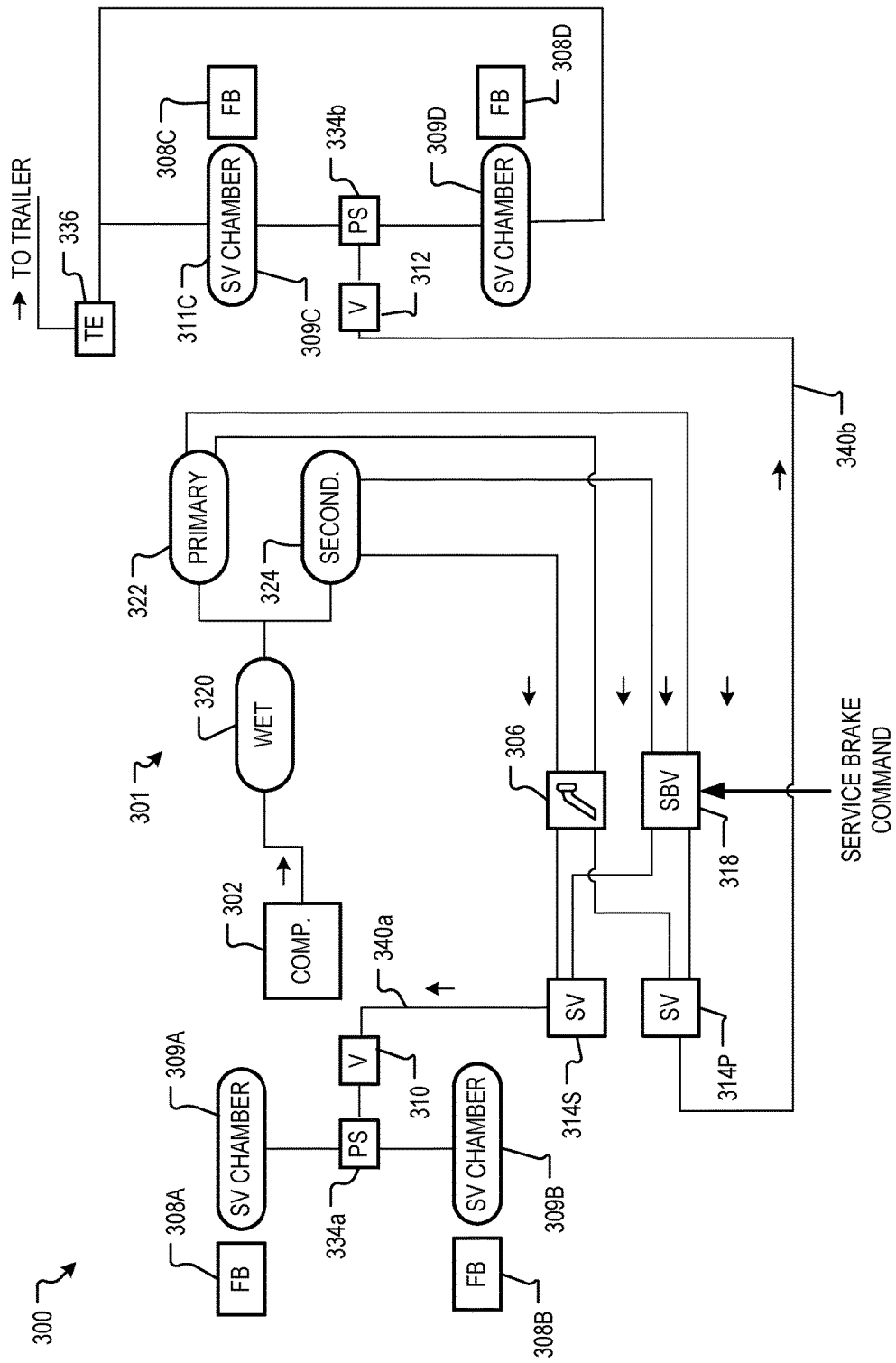
FIG. 6 is a diagram showing one example of a brake system that may be used in an AV, such as the vehicle of FIG. 1 or of FIG. 5.

FIG. 6 is a diagram showing one example of a brake system 300 that may be used in an AV, such as the vehicle 102 of FIG. 1 or 200 of FIG. 5. The brake system 300 is an air brake system, such as may be used in a truck, tractor-trailer, or any other suitable vehicle.

The brake system 300 includes a compressor 302 that is powered by an engine of the vehicle. The compressor 302 provides pressurized air to a pressurized air reservoir 301. In the example of FIG. 6, the pressurized air reservoir includes a wet reservoir 320, a primary reservoir 322, and a secondary reservoir 324. For example, the compressor 302 is in fluid communication with the wet reservoir 320 to provide pressurized air to the wet reservoir 320. The wet reservoir 320 is in fluid communication with the primary reservoir 322 and the secondary reservoir 324. The primary and secondary reservoirs 322, 324 are used, respectively, to provide pressurized air to front foundation brakes 308A, 308B (secondary reservoir 324) and the rear foundation brakes 308C, 308D (primary reservoir 322). In some examples, the brake system 300 includes various other components related to the pressurized air reservoir 301, such as, for example, a governor for regulating the air pressure in the pressurized air reservoir 301, an air dryer for removing moisture from air, or various other reservoirs.

Pressurized air from the pressurized air reservoir 301 is used to selectively provide pressurized air to service brake chambers 309A, 309B, 309C, 309D, causing the brake chambers 309A, 309B, 309C, 309D, to engage or disengage the foundation brakes 308A, 308B, 308C, 308D. Foundation brakes 308A, 308B, 308C, 308D include mechanisms positioned, for example, at the wheels or axles of the vehicle to slow or stop the wheels of the vehicle in response to the pressurized air. Any suitable type of foundation brake may be used including, for example, drum brake mechanisms, disc brake mechanisms, air over hydraulic brake mechanisms, or wedge brake mechanisms.

The pressurized air reservoir 301 is in fluid communication with a pedal valve 306 and with service brake valve 318. In some examples, the pedal valve 306 is referred to as a treadle valve. Pressurized air (or another suitable fluid) flows between the pedal valve 306 and the service brake valve 318. The pedal valve 306 may include and/or be used with a brake pedal that is controlled by the human user to apply and/or release the brakes. The service brake valve 318 responds to service brake commands from a vehicle autonomy system, such as vehicle autonomy system 106 or 220, to apply and/or release the service brakes by allowing or preventing the flow of pressurized air from the pressurized air reservoir 301 to the service brake chambers 309A, 309B, 309C, 309D. The service brake command indicates a level of braking called for by the vehicle autonomy system. In response to the service brake command, a brake controller modulates the state of the service brake valve 318, for example, by moving the service brake valve 318 from its current state to a more open position, moving the service brake valve 318 from its current state to a more closed position, leaving the service brake valve 318 in its current state, and so forth. This regulates the pressure passed by the service brake valve 318.

In some examples, the service brake valve 318 includes an electro-mechanical device or other suitable device for opening and closing the service brake valve 318 in response to an electrical or other suitable signal originating from the vehicle autonomy system. For example, the service brake valve 318 may include a solenoid that opens and/or closes the service brake valve 318. The vehicle autonomy system (e.g., via a brake controller) provides an electrical signal (e.g., a current) to the electro-mechanical device to modulate the service brake valve 318. Modulating the service brake valve 318 includes opening the service brake valve 318, closing the service brake valve 318, maintaining the current state of the service brake valve 318, and so forth. Also, in some examples, the service brake valve 318 includes a control circuit that is configured to execute a series of changes in the state of the service brake 318 in response to a single service brake command.

In the example of FIG. 6, the pedal valve 306 and service brake valve 318 modulate a primary service brake line and a secondary service brake line. The primary service brake line provides pressurized air from the primary reservoir 322 to the service brake chambers 309C, 309D. The secondary service brake line provides pressurized air from the secondary reservoir 324 to the service brake chambers 309A, 309B. The pedal valve 306 and service brake valve 318 may modulate both the primary and secondary service brake lines together at the same rate or at different rates.

The service brake valve 318 and pedal valve are in fluid communication with respective shuttle valves 314S, 314P. A primary shuttle valve 314P is positioned between the pedal valve 306 and service brake valve 318 on one side and the service brake chambers 309C, 309D on the other side. The secondary shuttle valve 314S is positioned between the pedal valve 306 and service brake valve 318 on one side and the service brake chambers 309A, 309B on the other side.

Pressurized air controlled by the pedal valve 306 and/or the service brake valve 318 is provided to the shuttle valves 314P, 314S. The shuttle valves 314S, 314P each comprise a first input to receive pressurized air from the pedal valve 306 and a second input to receive pressurized air from the service brake valve 318. An output of the shuttle valve 314P is in fluid communication with the service brake chambers 309C, 309D. An output of the shuttle valve 315S is in fluid communication with the service brake chambers 309A, 309B. One or more quick release valves 310, 312 and/or other components, may be positioned between the shuttle valves 314P, 314S and the respective service brake chambers 309A, 309B, 309C, 309D. Optional pressure sensors 334a and 334 may be positioned between the The shuttle valves 314P, 314S are configured to provide, at their respective outputs, the highest pressure provided at one of the inputs. For example, if the highest pressure is provided from the pedal valve 306 (indicating that the human user is calling for harder braking than vehicle autonomy system), then the shuttle valves 314P, 314S provide the pressure from the pedal valve 306 to the service brake chambers 309A, 309B, 309C, 309D. On the other hand, if the highest pressure is provided from the service brake valve 318 (indicating that the vehicle autonomy system is calling for harder braking than the human user), then the shuttle valves 314S, 314P provide the pressure provided from the service brake valve 318 and the pedal valve 306 to the service brake chambers 309A, 309B, 309C, 309D.

The service brake lines 340a and 340b may be equipped with one or more pressure sensor(s) 334a and 334b respectively, and a trailer take-off line 336. The pressure sensor(s) 334a and 334b may be used, as described herein, to generate a pressure signal. The pressure signal may be used, for example, by the vehicle autonomy system to determine a pressure within the braking system 108 to facilitate a proper pre-loading of the braking system under certain conditions. The trailer take-off 336 may be connected to one or more service brakes of a trailer, for example, allowing service brakes of the trailer and tractor to be engaged and disengaged together.

Figure 7:
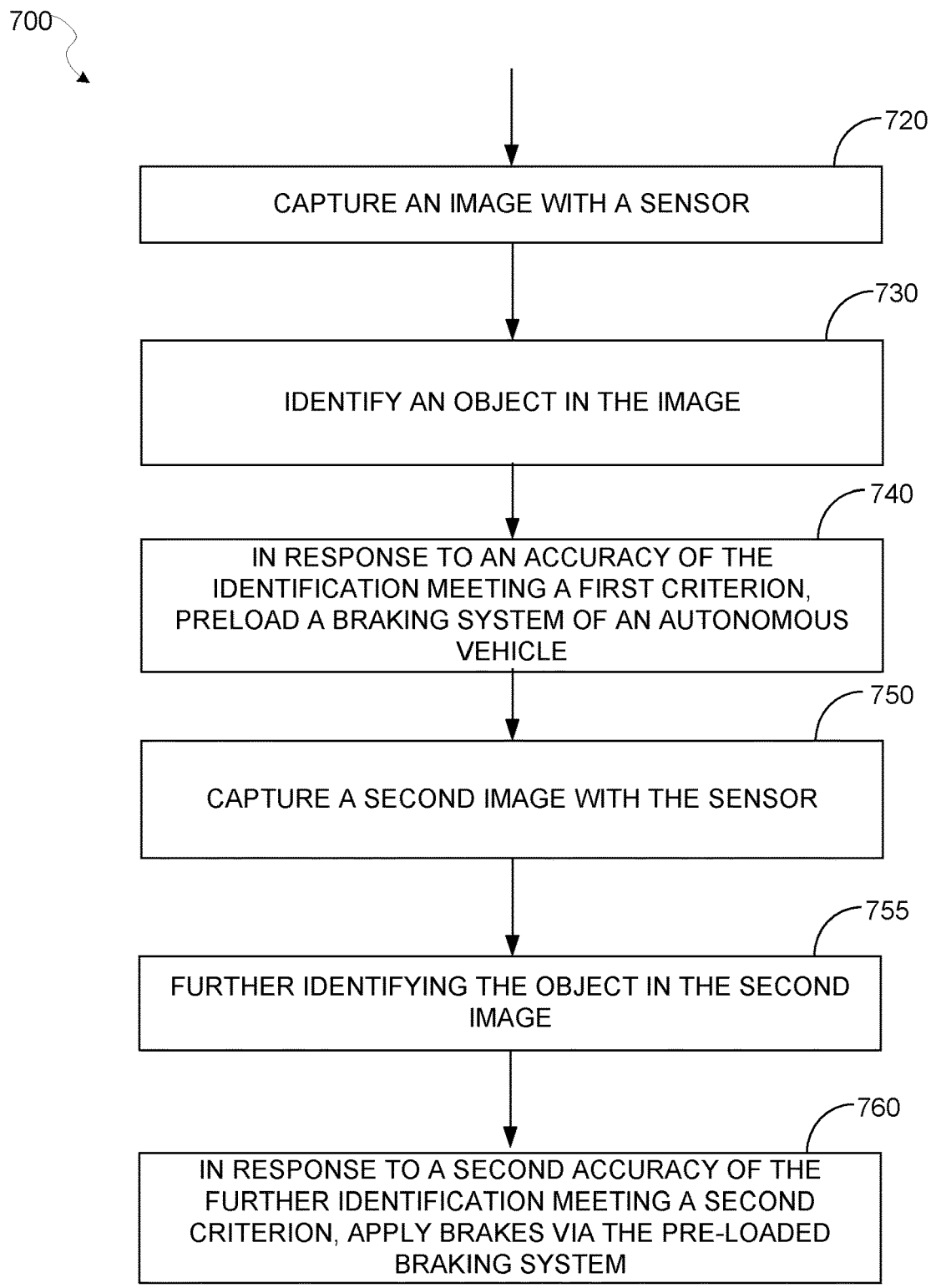
FIG. 7 is a flowchart of an example method for pre-loading a braking system.

FIG. 7 is a flowchart of an example method for pre-loading the braking system 108. In some aspects, one or more of the functions discussed below with respect to FIG. 7 may be performed by hardware processing circuitry. For example, hardware processing circuitry included in the vehicle autonomy system 106 may be configured to perform one or more of the functions discussed below. As one example, instructions 218 may configure the processors 212 to perform one or more of the functions discussed below with respect to FIG. 7.

In operation 720, an image is captured with a first sensor. In some aspects for example, an image may be captured with the sensor(s) 107, discussed above with respect to FIG. 1. In some aspects, multiple images may be captured by multiple sensors or even a single sensor in operation 720, with the resulting images stitched together or integrated into a single image.

In operation 730, an object is identified in the image. As discussed above, the perception system 203 may in some aspects, identify objects within an image captured by the sensor 107. The perception system 203 may use one or more of a variety of object detection algorithms to identify the object. For example, feature based object recognition methods, such as scale invariant feature transform(SIFT) or speeded up robust features (SURF) may be implemented in various embodiments.

In some aspects, the perception system 203 may determine a set of probabilities, with each probability indicating a probability of whether a detected object in the image is a particular type of object within a corresponding set of object types. The object types included in the set of object types may include, for example, one or more of a pedestrian object type, vehicle object type, dog object type, plastic bag object type, bicyclist object type, motorcyclist object type, traffic police object type, traffic sign object type, or many other possible object types. In some aspects, these probabilities may be expressed as a floating point number between zero (0) and one (1) and/or equal to zero (0) or one (1).

An accuracy of the identification may, in some aspects, relate to the set of probabilities. For example, in some aspects, an accuracy may represent a highest probability in the set of probabilities. In some aspects, the accuracy may relate to an amount of data used to identify the object. For example, in some aspects, the accuracy of identification may be proportional to a number of images in which the object is detected. In some embodiments, if the object is detected in only a single image, there may be a substantial probability that the object is caused by noise, or results from another transient imaging artifact. In some embodiments, operation 730 may include multiple imaging sweeps of a scene including the object. The multiple imaging sweeps may include data collected from one or more different sensors. As each data obtained from each sweep is analyzed by the perception system 203, an accuracy of an object's identification may increase. Detecting the object in multiple images may reduce the probability that the detected object is noise and thus increase its identification accuracy.

In some aspects, the accuracy may relate both to a number of images used to recognize a particular object and the probabilities. For example, in some aspects, an accuracy of an identification of an object may be based on equation 1 below:

$$A_i = \text{num\_sweeps}/K^*(\max(P_{i_1 \ldots n}))$$

where:
- $A_i$ is an accuracy of an identification of an object in an image i,
- K is a constant value,
- num_sweeps is a number of images where the object was identified,
- max ($P_i$) is a maximum probability within the set of probabilities the object is any one of a set of objects 1 . . . n, where the probability is determined based on the image i (as discussed above).

In some aspects, the identification of the object in operation 730 may be performed by an image processing neural network, such as a trained convolutional neutral network (CNN). The neural network may generate the probabilities discussed above when provided with one or more images.

In operation 740, a braking system of an autonomous vehicle is pre-loaded in response to the accuracy of the identification in operation 730 meeting one or more criterion. The one or more criterion may vary by embodiment. In some embodiments, one criterion may relate to whether the accuracy of the identification is above a threshold. In some aspects, different thresholds may be applied for different types of objects. For example, the criterion may be met if an object is recognized as a first type of object (e.g. pedestrian) with a first probability threshold or if the object is recognized as a second type of object (e.g. dog), with a second probability threshold.

Thus, if the object is not adequately identified in operation 720, application of the braking system so as to apply a force against motion of a vehicle may be inappropriate. At the same time, the prediction system 204 may indicate that the object is predicted to be within a path of the autonomous vehicle. Thus, pre-loading of the braking system may allow the AV to prepare to take action to avoid a collision with the object, while also allowing the perception system with additional time to improve the accuracy of the object identification.

In some aspects, one of the one or more criterion may relate to a distance between the object and the AV. The pre-loading may then be based on these criterion. For example, if the object is further from the autonomous vehicle than a threshold distance, no pre-loading may be performed. In some aspects, the threshold distance may be based on a current speed of the AV. In some aspects, a table mapping speeds to threshold distances may be maintained, and the table consulted to determine the threshold distance. Alternatively, the threshold distance may be based on a formula in some aspects that receives the vehicle's current speed as a parameter. In some aspects, ambient temperature, road conditions and/or vehicle weight may also effect the threshold distance.

In some aspects, one or more of the one or more criterion may relate to a predicted path of the object. As discussed above, the prediction system 204 may predict future locations of objects. Thus, a particular object may be recognized with a relatively high degree of accuracy, but may currently be located outside a predicted path of the vehicle. However, the prediction system may predict, with a particular confidence level, that the object will move into the path of the vehicle and therefore represents a threat to safe vehicle operation. Thus, in some aspects, a pre-loading of the braking situation may be based on these criterion. In other words, recognition of the object may be able a braking system application threshold in addition to the pre-load threshold, but since the object is not currently within the path of the vehicle, the brakes are not applied. However, because the predicted path of the object is within the path of the vehicle, the pre-loading of the braking system is initiated. Thus, some embodiments may implement two pre-load threshold. A first pre-load threshold for recognition accuracy for objects currently within a predicted path of the vehicle. A second pre-load threshold applied to a prediction accuracy level that the object will move into the path of the vehicle, or occupy a location also occupied by the vehicle at the same time.

One or more of these example conditions may be combined in various embodiments.

In operation 750, a second image is captured with the first sensor (e.g., sensor 107). In some other aspects, the second image may be captured with a second, different sensor than was used to capture the first image.

In operation 755, the object is further identified based on the second image. The further identification has a second level of accuracy. In some aspects, the second level of accuracy may be based on use of both the first image and the second image to identify the object. For example, as discussed above, in some aspects, the accuracy of an identification may be based at least in part, on a number of images used to perform the identification. Generally, as the number of images used increases, the recognition accuracy also increases. An increase in object recognition accuracy may increase of decrease a probability of pre-loading of a braking system. For example, a probability that an object is a pedestrian may decrease as more images are captured when a probability that the object is a paper bag may increase as the more images are captured.

In some embodiments, operation 755 updates the set of probabilities discussed above with respect to operation 730. Some probabilities determined in operation 730 may decrease when updated in operation 755. For example, in some aspects, a resolution or clarity of the object may improve in the second image relative to the first image. This increased clarity may reduce probabilities that the object is a particular type of one or more objects, and increase one or more probabilities that the object is one or more other particular types of objects. Operation 755 may rely on the same object recognition methods to perform the further identification as were used in operation 730 to perform the initial or first identification of process 700.

In operation 760, the brakes of the AV are applied based on a second accuracy of the further identification. The brakes are applied to slow or stop the AV. In embodiments that utilize a fluid-based braking system (e.g. air or oil), application of the brakes in operation 760 may include increasing a pressure of the braking system beyond an application pressure (e.g. 160), such that more than a de minimis braking force is applied against a momentum of the AV.

In aspects utilizing a non-air based braking system, applying the brakes may include increasing friction between two braking surfaces of the AV so as to slow the AV. The friction may be increased by application of pressure against one of the braking surfaces such that it presses (further) against the other braking surface. These embodiments may also monitor the braking application via one or more of electrical resistance between the two braking systems, a change in velocity of the autonomous vehicle, or a period of time during which a force is applied to at least one of the braking surfaces against another braking surface. In some aspects, application of the brakes in operation 760 may cause application of a brake command as discussed below with respect to FIG. 9 and operation 905.

Some aspects of process 700 may remove the braking system from a pre-loaded condition under certain conditions. For example, if a recognition accuracy of the object identified in operation 730 drops below a defined threshold, the braking system may be returned to a quiescent or unloaded condition. Alternatively, if a defined period of time passes, or if the vehicle travels a threshold distance without the brakes being applied, the braking system may be returned to a quiescent state.

Figure 8:
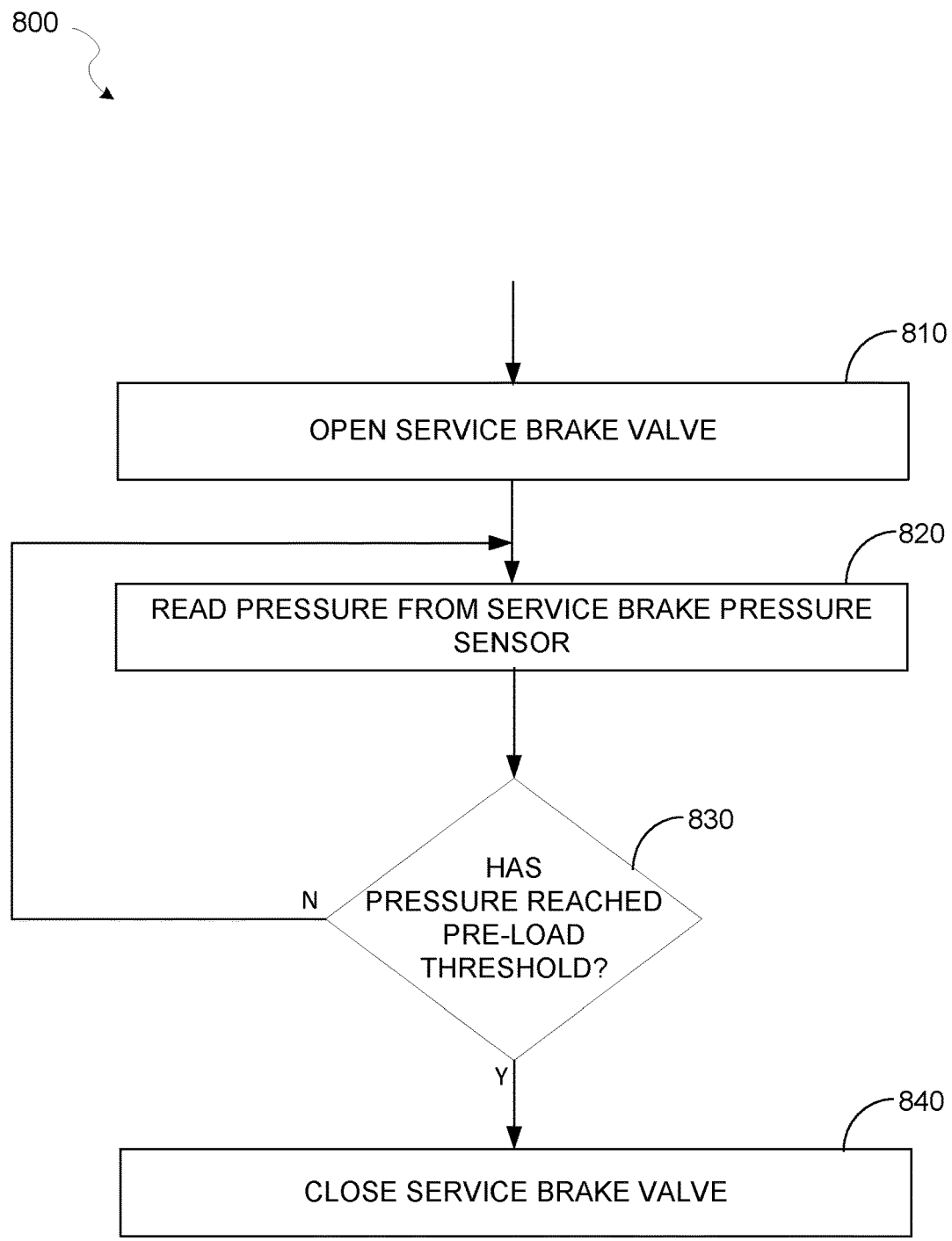
FIG. 8 is a flowchart of an example method for pre-loading a braking system.

FIG. 8 is a flowchart of an example process for pre-loading a braking system. The process 800 discussed below with respect to FIG. 8 is intended to describe one example method of pre-loading an air-based braking system. Other embodiments may not utilize an air-brake braking system and thus may deviate at least to an extent, from some of the specific example operations discussed below.

In some aspects, one or more of the functions discussed below with respect to FIG. 8 may be performed by hardware processing circuitry. For example, hardware processing circuitry included in the vehicle autonomy system 106 may be configured to perform one or more of the functions discussed below. As one example, instructions 218 may configure the processors 212 to perform one or more of the functions discussed below with respect to FIG. 8.

In operation 810, a service brake valve is opened. For example, in some aspects, operation 810 may open the service brake valve 318, discussed above with respect to FIG. 6. Opening the valve may allow pressure to flow from a pressure reservoir (e.g., 322, 324) or compressor (e.g., 302) to one or more service brake chambers (e.g. 311a-d).

In operation 820, a pressure is read from a service brake pressure sensor (e.g. 334a or 334b). The service brake pressure sensor may allow for determination of a pressure within at least a portion of a service braking system (e.g. 108). Decision block 830 determines whether the pressure has reached a brake pre-load threshold level. The brake pre-load threshold level may be a level below the application pressure 160, discussed above with respect to FIG. 2A. In some aspects, the brake-pre-load threshold level may be within the pre-loaded state 158 illustrated above with respect to FIG. 2A. If the pressure has not reached the pre-load level, process 800 returns to operation 820, otherwise, the service brake valve is closed in operation 840 to stabilize the braking system at the pre-load threshold level. Stabilizing the braking system may include periodically (or as needed) adding or venting of fluid or mechanical pressure to maintain the pressure within a pre-load range.

Figure 9:
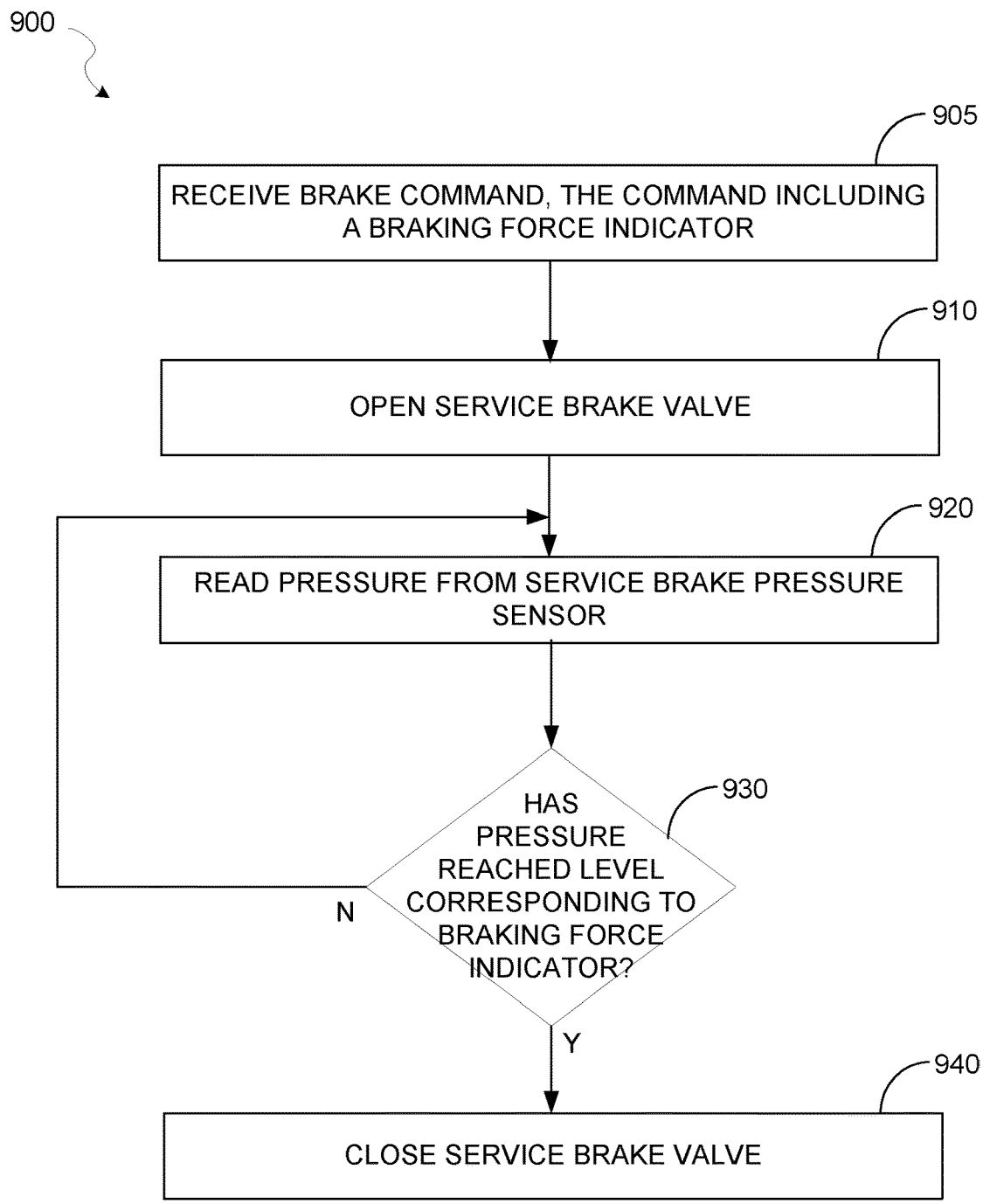
FIG. 9 is a flowchart of an example method for applying brakes in an autonomous vehicle.

FIG. 9 is a flowchart of an example process for applying brakes in an autonomous vehicle. The process 900 discussed below with respect to FIG. 8 is intended to describe one example method of pre-loading an air-based braking system. Other embodiments may not utilize an air-brake braking system and thus may deviate at least to an extent, from some of the specific example operations discussed below.

In some aspects, one or more of the functions discussed below with respect to FIG. 9 may be performed by hardware processing circuitry. For example, hardware processing circuitry included in the vehicle autonomy system 106 may be configured to perform one or more of the functions discussed below with respect to FIG. 9. As one example, instructions 218 may configure the processors 212 to perform one or more of the functions discussed below with respect to FIG. 9.

In operation 905, a brake command is received. The brake command indicates that brakes should be applied, and also indicates a braking force indicator. In operation 910, a service brake valve is opened (e.g. 318). Opening the service brake valve allows one or more service brake chambers to be pressurized (further) via a pressure reservoir (e.g. 322, 324) and/or a compressor (e.g. 302).

In operation 920, a pressure is read from a service brake pressure sensor (e.g. 334*a* or 334*b*). Decision operation 930 determines whether a pressure within the service brake system 108 has reached a level corresponding to the braking force indicator. For example, decision operation 930 may determine whether the braking system pressure falls within an appropriate range of region 162, discussed above with respect to FIG. 2A, given the braking force indication received in operation 905. If the pressure has not reached the appropriate level, process 900 returns to operation 920, otherwise, the service brake valve (e.g. 318) is closed in operation 940 to stabilize the pressure in the braking system at the appropriate level for the braking force indicator.

Figure 10:
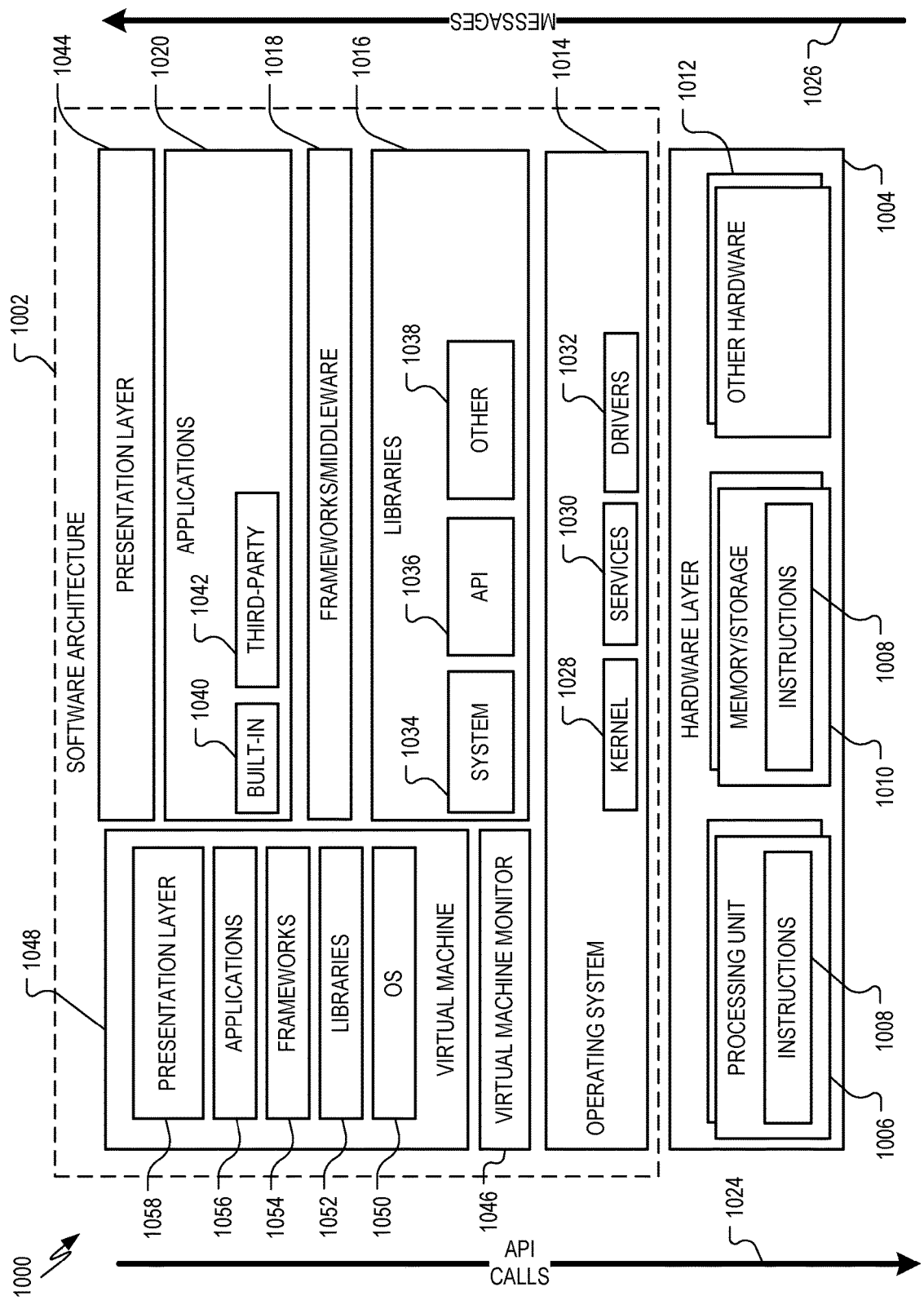
FIG. 10 is a block diagram showing one example of a software architecture for a computing device.

FIG. 10 is a block diagram 1000 showing one example of a software architecture 1002 for a computing device. The software architecture 1002 may be used in conjunction with various hardware architectures, for example, as described herein. FIG. 10 is merely a non-limiting example of a software architecture 1002 and many other architectures may be implemented to facilitate the functionality described herein. A representative hardware layer 1004 is illustrated and can represent, for example, any of the above-referenced computing devices. In some examples, the hardware layer 1004 may be implemented according to an architecture 1002 of FIG. 10 and/or the architecture 1100 of FIG. 11.

The representative hardware layer 1004 comprises one or more processing units 1006 having associated executable instructions 1008. The executable instructions 1008 represent the executable instructions of the software architecture 1002, including implementation of the methods, modules, components, and so forth of FIGS. 1-9. The hardware layer 1004 also includes memory and/or storage modules 1010, which also have the executable instructions 1008. The hardware layer 1004 may also comprise other hardware 1012, which represents any other hardware of the hardware layer 1004, such as the other hardware illustrated as part of the architecture 1000.

In the example architecture of FIG. 10, the software architecture 1002 may be conceptualized as a stack of layers where each layer provides particular functionality. For example, the software architecture 1002 may include layers such as an operating system 1014, libraries 1016, frameworks/middleware 1018, applications 1020, and a presentation layer 1044. Operationally, the applications 1020 and/or other components within the layers may invoke API calls 1024 through the software stack and receive a response, returned values, and so forth illustrated as messages 1026 in response to the API calls 1024. The layers illustrated are representative in nature and not all software architectures have all layers. For example, some mobile or special-purpose operating systems may not provide a frameworks/middleware 1018 layer, while others may provide such a layer. Other software architectures may include additional or different layers.

The operating system 1014 may manage hardware resources and provide common services. The operating system 1014 may include, for example, a kernel 1028, services 1030, and drivers 1032. The kernel 1028 may act as an abstraction layer between the hardware and the other software layers. For example, the kernel 1028 may be responsible for memory management, processor management (e.g., scheduling), component management, networking, security settings, and so on. The services 1030 may provide other common services for the other software layers. In some examples, the services 1030 include an interrupt service. The interrupt service may detect the receipt of a hardware or software interrupt and, in response, cause the software architecture 1002 to pause its current processing and execute an ISR when an interrupt is received. The ISR may generate an alert.

The drivers 1032 may be responsible for controlling or interfacing with the underlying hardware. For instance, the drivers 1032 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 1016 may provide a common infrastructure that may be used by the applications 1020 and/or other components and/or layers. The libraries 1016 typically provide functionality that allows other software modules to perform tasks in an easier fashion than by interfacing directly with the underlying operating system 1014 functionality (e.g., kernel 1028, services 1030, and/or drivers 1032). The libraries 1016 may include system libraries 1034 (e.g., C standard library) that may provide functions such as memory allocation functions, string manipulation functions, mathematic functions, and the like. In addition, the libraries 1016 may include API libraries 1036 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1016 may also include a wide variety of other libraries 1038 to provide many other APIs to the applications 1020 and other software components/modules.

The frameworks 1018 (also sometimes referred to as middleware) may provide a higher-level common infrastructure that may be used by the applications 1020 and/or other software components/modules. For example, the frameworks 1018 may provide various graphical user interface (GUI) functions, high-level resource management, high-level location services, and so forth. The frameworks 1018 may provide a broad spectrum of other APIs that may be used by the applications 1020 and/or other software components/modules, some of which may be specific to a particular operating system or platform.

The applications 1020 include built-in applications 1040 and/or third-party applications 1042. Examples of representative built-in applications 1040 may include, but are not limited to, a contacts application, a browser application, a book reader application, a location application, a media application, a messaging application, and/or a game application. The third-party applications 1042 may include any of the built-in applications 1040 as well as a broad assortment of other applications. In a specific example, the third-party application 1042 (e.g., an application developed using the Android™ or iOS™ software development kit (SDK) by an entity other than the vendor of the particular platform) may be mobile software running on a mobile operating system such as iOS™, Android™, Windows® Phone, or other computing device operating systems. In this example, the third-party application 1042 may invoke the API calls 1024 provided by the mobile operating system such as the operating system 1014 to facilitate functionality described herein.

The applications 1020 may use built-in operating system functions (e.g., kernel 1028, services 1030, and/or drivers 1032), libraries (e.g., system libraries 1034, API libraries 1036, and other libraries 1038), or frameworks/middleware 1018 to create user interfaces to interact with users of the system. Alternatively, or additionally, in some systems, interactions with a user may occur through a presentation layer, such as the presentation layer 1044. In these systems, the application/module "logic" can be separated from the aspects of the application/module that interact with a user.

Some software architectures use virtual machines. For example, systems described herein may be executed using one or more virtual machines executed at one or more server computing machines. In the example of FIG. 10, this is illustrated by a virtual machine 1048. A virtual machine creates a software environment where applications/modules can execute as if they were executing on a hardware computing device. The virtual machine 1048 is hosted by a host operating system (e.g., the operating system 1014) and typically, although not always, has a virtual machine monitor 1046, which manages the operation of the virtual machine 1048 as well as the interface with the host operating system (e.g., the operating system 1014). A software architecture executes within the virtual machine 1048, such as an operating system 1050, libraries 1052, frameworks/middleware 1054, applications 1056, and/or a presentation layer 1058. These layers of software architecture executing within the virtual machine 1048 can be the same as corresponding layers previously described or may be different.

Figure 11:
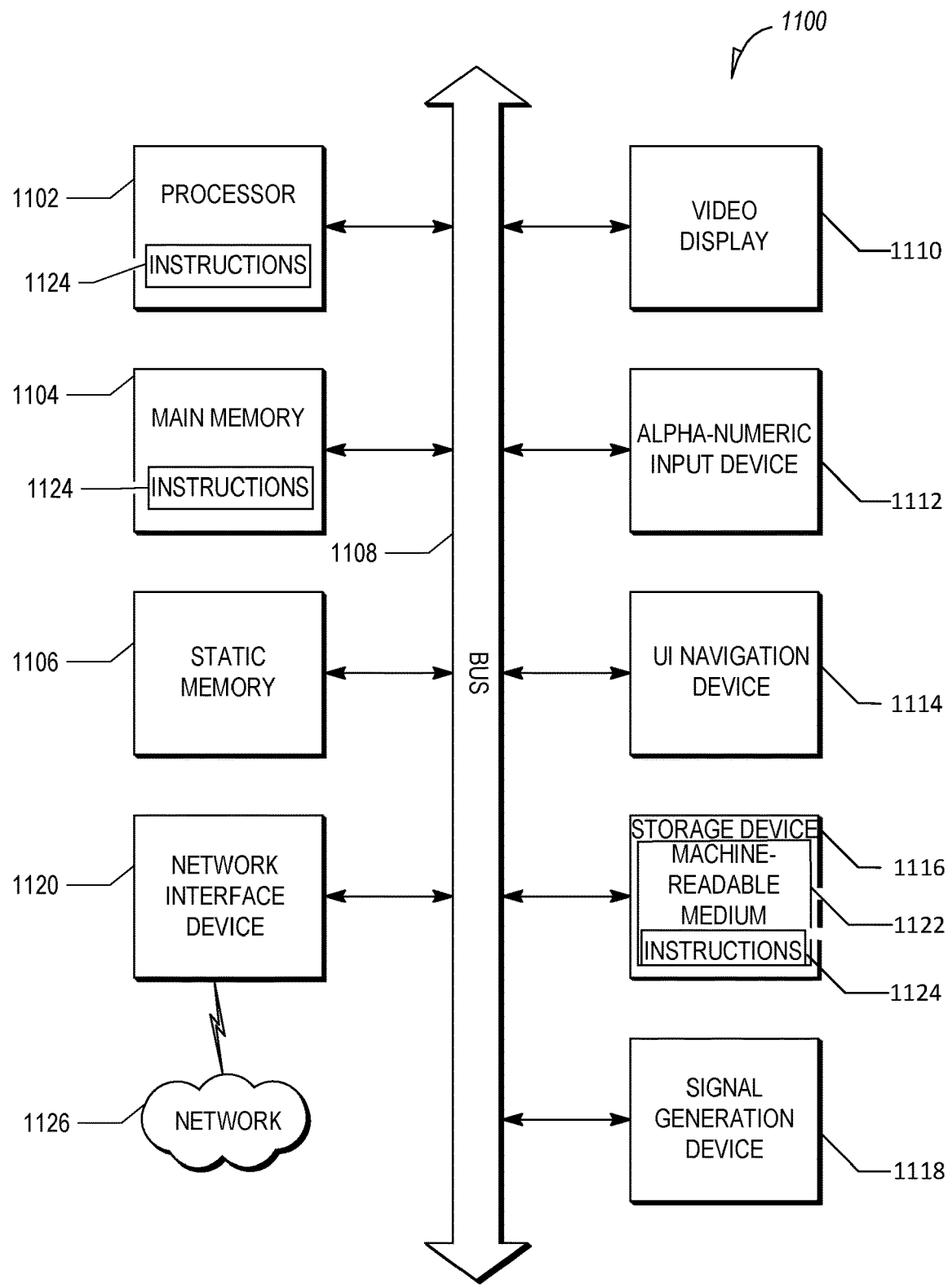
FIG. 11 is a block diagram illustrating a computing device hardware architecture, within which a set or sequence of instructions can be executed to cause a machine to perform examples of any one of the methodologies discussed herein.

FIG. 11 is a block diagram illustrating a computing device hardware architecture 1100, within which a set or sequence of instructions can be executed to cause a machine to perform examples of any one of the methodologies discussed herein. The architecture 1100 may describe, a computing device for executing the vehicle autonomy system, localizer(s), and/or pose filter described herein.

The architecture 1100 may operate as a standalone device or may be connected (e.g., networked) to other machines. In a networked deployment, the architecture 1100 may operate in the capacity of either a server or a client machine in server-client network environments, or it may act as a peer machine in peer-to-peer (or distributed) network environments. The architecture 1100 can be implemented in a personal computer (PC), a tablet PC, a hybrid tablet, a set-top box (STB), a personal digital assistant (PDA), a mobile telephone, a web appliance, a network router, a network switch, a network bridge, or any machine capable of executing instructions (sequential or otherwise) that specify operations to be taken by that machine.

The example architecture 1100 includes a processor unit 1102 comprising at least one processor (e.g., a central processing unit (CPU), a graphics processing unit (GPU), or both, processor cores, compute nodes, etc.). The architecture 1100 may further comprise a main memory 1104 and a static memory 1106, which communicate with each other via a link 1108 (e.g., bus). The architecture 1100 can further include a video display unit 1110, an input device 1112 (e.g., a keyboard), and a UI navigation device 1114 (e.g., a mouse). In some examples, the video display unit 1110, input device 1112, and UI navigation device 1114 are incorporated into a touchscreen display. The architecture 1100 may additionally include a storage device 1116 (e.g., a drive unit), a signal generation device 1118 (e.g., a speaker), a network interface device 1120, and one or more sensors (not shown), such as a Global Positioning System (GPS) sensor, compass, accelerometer, or other sensor.

In some examples, the processor unit 1102 or another suitable hardware component may support a hardware interrupt. In response to a hardware interrupt, the processor unit 1102 may pause its processing and execute an ISR, for example, as described herein.

The storage device 1116 includes a machine-readable medium 1122 on which is stored one or more sets of data structures and instructions 1124 (e.g., software) embodying or used by any one or more of the methodologies or functions described herein. The instructions 1124 can also reside, completely or at least partially, within the main memory 1104, within the static memory 1106, and/or within the processor unit 1102 during execution thereof by the architecture 1100, with the main memory 1104, the static memory 1106, and the processor unit 1102 also constituting machine-readable media.

Executable Instructions and Machine-Storage Medium

The various memories (i.e., 1104, 1106, and/or memory of the processor unit(s) 1102) and/or storage device 1116 may store one or more sets of instructions and data structures (e.g., instructions) 1124 embodying or used by any one or more of the methodologies or functions described herein. These instructions, when executed by processor unit(s) 1102 cause various operations to implement the disclosed examples.

As used herein, the terms "machine-storage medium," "device-storage medium," "computer-storage medium" (referred to collectively as "machine-storage medium 1122") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 1122 include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media 1122 specifically exclude carrier waves, modulated data signals, and other such media, at least some of which are covered under the term "signal medium" discussed below.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions 1124 can further be transmitted or received over a communications network 1126 using a transmission medium via the network interface device 1120 using any one of a number of well-known transfer protocols (e.g., HTTP). Examples of communication networks include a LAN, a WAN, the Internet, mobile telephone networks, plain old telephone service (POTS) networks, and wireless data networks (e.g., Wi-Fi, 3G, and 11G LTE/LTE-A or WiMAX networks). The term "transmission medium" shall be taken to include any intangible medium that is capable of storing, encoding, or carrying instructions for execution by the machine, and includes digital or analog communications signals or other intangible media to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Various components are described in the present disclosure as being configured in a particular way. A component may be configured in any suitable manner. For example, a component that is or that includes a computing device may be configured with suitable software instructions that program the computing device. A component may also be configured by virtue of its hardware arrangement or in any other suitable manner.

The above description is intended to be illustrative, and not restrictive. For example, the above-described examples (or one or more aspects thereof) can be used in combination with others. Other examples can be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it will not be used to interpret or limit the scope or meaning of the claims.

Example 1 is an apparatus, comprising: hardware processing circuitry; a hardware memory storing instructions that, when executed, configure the hardware processing circuitry to perform operations comprising: capturing a first image via a sensor; identifying an object in the first image; and in response to an accuracy of the identification meeting a first criterion, pre-loading a braking system of an autonomous vehicle.

In Example 2, the subject matter of Example 1 optionally includes the operations further comprising: capturing a second image with the sensor; further identifying the object in the second image; and in response to an accuracy of the further identification meeting a second criterion, applying brakes via the pre-loaded braking system.

In Example 3, the subject matter of any one or more of Examples 1-2 optionally include the braking system, the braking system comprising: a pressurized air reservoir; a service brake chamber in fluid communication with the pressurized air reservoir via a service brake line; and a service brake valve on the service brake line to control a flow of pressurized air from the pressurized air reservoir to the service brake chamber to selectively engage or disengage a service brake, wherein the pre-loading of the braking system places the service brake valve in an open position so as to route pressurized air from the pressurized air reservoir to the service brake chamber.

In Example 4, the subject matter of Example 3 optionally includes a pressure sensor in fluid communication with the service brake chamber, wherein the pre-loading of the braking system reads a pressure measurement from the pressure sensor and maintains the service brake valve in the open position until the pressure measurement indicates a pressure above a first threshold.

In Example 5, the subject matter of any one or more of Examples 1-4 optionally include the operations further comprising releasing the pre-load of the braking system in response to the accuracy of the further identification meeting a second criterion.

In Example 6, the subject matter of any one or more of Examples 1-5 optionally include wherein the accuracy of the identification does not meet the first criterion if the identification of the object is based on less than a predefined number of images.

In Example 7, the subject matter of any one or more of Examples 1-6 optionally include providing the first image to a trained model to generate a set of probabilities that the object is each of a corresponding set of object types, wherein the accuracy of the identification does not meet the first criterion if none of the probabilities in the set of probabilities is above a threshold.

In Example 8, the subject matter of Example 7 optionally includes wherein the accuracy of the identification meets the first criterion if at least one of the probabilities in the set of probabilities is above the threshold.

In Example 9, the subject matter of any one or more of Examples 1-8 optionally include an imaging sensor, wherein the sensor is the imaging sensor.

In Example 10, the subject matter of any one or more of Examples 1-9 optionally include a ranging sensor, wherein the sensor is the ranging sensor.

In Example 11, the subject matter of any one or more of Examples 1-10 optionally include the operations further comprising capturing a third image and fusing the third image with the first image, wherein the identification of the object is based on the fused third and first images.

In Example 12, the subject matter of any one or more of Examples 1-11 optionally include wherein pre-loading the braking system of the autonomous vehicle comprises one or more of monitoring an air pressure within a braking chamber of the braking system, monitoring a resistance between at least two braking surfaces of the braking system, monitoring a velocity of the autonomous vehicle, or activating the braking system for a defined time limit, the defined time limit insufficient to cause a braking force against motion of the autonomous vehicle.

In Example 13, the subject matter of any one or more of Examples 1-12 optionally include an autonomous vehicle.

Example 14 is a method, comprising: capturing a first image via an imaging sensor; identifying an object in the first image; and in response to an accuracy of the identification meeting a first criterion, pre-loading a braking system of an autonomous vehicle.

In Example 15, the subject matter of any one or more of Examples 13-14 optionally include capturing a second image with the sensor; further identifying the object in the second image; and in response to an accuracy of the further identification meeting a second criterion, applying brakes via the pre-loaded braking system.

In Example 16, the subject matter of any one or more of Examples 14-15 optionally include releasing the pre-load of the braking system in response to the accuracy of the further identification meeting a second criterion.

In Example 17, the subject matter of any one or more of Examples 14-16 optionally include wherein the accuracy of the identification does not meet the first criterion if the identification of the object is based on less than a predefined number of images.

In Example 18, the subject matter of any one or more of Examples 14-17 optionally include providing the first image to a trained model to generate a set of probabilities that the object is each of a corresponding set of object types, wherein the accuracy of the identification does not meet the first criterion if none of the probabilities in the set of probabilities is above a threshold.

In Example 19, the subject matter of any one or more of Examples 14-18 optionally include predicting a path of the autonomous vehicle; predicting a path of the object; and determining a probability that the path of the object intersects with the path of the autonomous vehicle, wherein the pre-loading of the braking system is further based on the probability.

In Example 20, the subject matter of Example 19 optionally includes predicting if a position of the autonomous vehicle will overlap with a position of the object at a particular time, wherein the pre-loading of the braking system is further based on the prediction.

Example 21 is a non-transitory computer readable storage medium comprising instructions that when executed configure hardware processing circuitry to perform operations comprising: capturing a first image via an imaging sensor; identifying an object in the first image; and in response to an accuracy of the identification meeting a first criterion, pre-loading a braking system of an autonomous vehicle.

In Example 22, the subject matter of any one or more of Examples 19-21 optionally include the operations further comprising: capturing a second image with the sensor; further identifying the object in the second image; and in response to an accuracy of the further identification meeting a second criterion, applying brakes via the pre-loaded braking system.

In Example 23, the subject matter of any one or more of Examples 19-22 optionally include the operations further comprising providing the first image to a trained model to generate a set of probabilities that the object is each of a corresponding set of object types, wherein the accuracy of the identification does not meet the first criterion if none of the probabilities in the set of probabilities is above a threshold.

In Example 24, the subject matter of any one or more of Examples 19-23 optionally include the operations further comprising releasing the pre-load of the braking system in response to the accuracy of the further identification meeting a second criterion.

In Example 25, the subject matter of any one or more of Examples 19-24 optionally include wherein the accuracy of the identification does not meet the first criterion if the identification of the object is based on less than a predefined number of images.

In Example 26, the subject matter of any one or more of Examples 19-25 optionally include the operations further comprising: predicting a path of the autonomous vehicle; predicting a path of the object; and determining a probability that the path of the object intersects with the path of the autonomous vehicle, wherein the pre-loading of the braking system is further based on the probability.

In Example 27, the subject matter of Example 26 optionally includes the operations further comprising predicting if a position of the autonomous vehicle will overlap with a position of the object at a particular time, wherein the pre-loading of the braking system is further based on the prediction.

Example 28 is an apparatus comprising: means for capturing a first image via an imaging sensor; means for identifying an object in the first image; and means for in response to an accuracy of the identification meeting a first criterion, pre-loading a braking system of an autonomous vehicle.

In Example 29, the subject matter of Example 28 optionally includes the operations further comprising: means for capturing a second image with the sensor; means for further identifying the object in the second image; and means for applying brakes via the pre-loaded braking system in response to an accuracy of the further identification meeting a second criterion.

In Example 30, the subject matter of any one or more of Examples 28-29 optionally include means for providing the first image to a trained model to generate a set of probabilities that the object is each of a corresponding set of object types, wherein the means for applying brakes via the pre-loaded braking system is configured to determine the first criterion is not met if none of the probabilities in the set of probabilities is above a threshold.

In Example 31, the subject matter of any one or more of Examples 28-30 optionally include means for releasing the pre-load of the braking system in response to the accuracy of the further identification meeting a second criterion.

In Example 32, the subject matter of any one or more of Examples 28-31 optionally include wherein the means for applying brakes via the pre-loaded braking system is configured to not pre-load the braking system in response to identification of the object being based on less than a predefined number of images.

In Example 33, the subject matter of any one or more of Examples 28-32 optionally include the operations further comprising: means for predicting a path of the autonomous vehicle; means for predicting a path of the object; and means for determining a probability that the path of the object intersects with the path of the autonomous vehicle, wherein the means for pre-loading of the braking system is further configured to pre-load the braking system based on the probability.

In Example 34, the subject matter of Example 33 optionally includes means for predicting if a position of the autonomous vehicle will overlap with a position of the object at a particular time, wherein the means for pre-loading of the braking system is configured to pre-load the braking system based on the prediction.

Also, in the above Detailed Description, various features can be grouped together to streamline the disclosure. However, the claims cannot set forth every feature disclosed herein, as examples can feature a subset of said features. Further, examples can include fewer features than those disclosed in a particular example. Thus, the following claims are hereby incorporated into the Detailed Description, with each claim standing on its own as a separate example. The scope of the examples disclosed herein is to be determined with reference to the appended claims, along with the full scope of equivalents to which such claims are entitled.

We claim:
1. An apparatus, comprising:
one or more processors; and
a memory storing instructions that, when executed by the one or more processors, cause the one or more processors to perform operations comprising:
accessing first sensor data indicating an environment in which an autonomous vehicle is located;
estimating, using the first sensor data, a particular object in the environment;
determining an accuracy of the estimating of the particular object; and
increasing a braking pressure of a vehicle braking system of the autonomous vehicle to a first braking pressure, the first braking pressure being determined based on the accuracy of the estimating of the particular object.

2. The apparatus of claim 1, wherein the accuracy of the estimating of the particular object satisfies a threshold accuracy level and wherein the first braking pressure is insufficient to exert a braking force on the autonomous vehicle.

3. The apparatus of claim 2, the operations further comprising maintaining the vehicle braking system at the first braking pressure.

4. The apparatus of claim 1, the operations further comprising:
determining a velocity of the autonomous vehicle; and
modifying the braking pressure of the vehicle braking system to a modified braking pressure, the modified braking pressure being determined based on the velocity of the autonomous vehicle.

5. The apparatus of claim 1, the operations further comprising:
accessing second sensor data obtained after the first sensor data;
further estimating the particular object using the second sensor data; and
based on an accuracy of the further estimating of the particular object satisfying a criterion, applying brakes of the autonomous vehicle at least in part by further increasing the braking pressure of the vehicle braking system.

6. The apparatus of claim 1, further comprising:
the vehicle braking system, the vehicle braking system comprising:
a pressurized air reservoir;
a service brake chamber in fluid communication with the pressurized air reservoir via a service brake line; and
a service brake valve on the service brake line to control a flow of pressurized air from the pressurized air reservoir to the service brake chamber to selectively engage or disengage a service brake, the increasing of the braking pressure comprising configuring the service brake valve to route pressurized air from the pressurized air reservoir to the service brake chamber.

7. The apparatus of claim 6, further comprising a pressure sensor in fluid communication with the service brake chamber, wherein the increasing of the braking pressure comprises:
accessing a pressure measurement from the pressure sensor; and
maintaining the configuration of the service brake valve until the pressure measurement indicates a pressure satisfies a first threshold.

8. The apparatus of claim 1, the operations further comprising decreasing the braking pressure of the vehicle braking system in response to an accuracy of a further estimating of the particular object.

9. The apparatus of claim 1, the determining of the accuracy of the estimating of the particular object comprising determining that the estimating of the particular object is based on less than a threshold number of images.

10. The apparatus of claim 1, the operations further comprising determining, using a trained model, a probability that the particular object is of a first object type, the accuracy of the estimating of the particular object being determined based on the probability.

11. The apparatus of claim 1, the operations further comprising maintaining the braking pressure below a threshold braking pressure.

12. The apparatus of claim 1, the operations further comprising maintaining a resistance between at least two braking surfaces of the vehicle braking system below a threshold resistance.

13. The apparatus of claim 1, the operations further comprising maintaining a velocity of the autonomous vehicle while increasing the braking pressure.

14. The apparatus of claim 1, the operations further comprising activating the braking system for a defined time, the activating of the braking system for the defined time being insufficient to exert a braking force on the autonomous vehicle.

15. A method, comprising:
accessing first sensor data indicating an environment in which an autonomous vehicle is located;
estimating, using the first sensor data, a particular object in the environment;
determining an accuracy of the estimating of the particular object; and
increasing a braking pressure of a vehicle braking system of the autonomous vehicle to a first braking pressure, the first braking pressure being determined based on the accuracy of the estimating of the particular object.

16. The method of claim 15, further comprising:
accessing second sensor data obtained after the first sensor data;
further estimating the particular object using the second sensor data; and
based on an accuracy of the further estimating meeting a criterion, applying brakes of the autonomous vehicle at least in part by further increasing the braking pressure of the vehicle braking system.

17. The method of claim 15, further comprising determining, using a trained model, a probability that the particular object is of a first object type, the determining of the accuracy of the estimating of the particular object being based at least in part on the probability.

18. The method of claim 15, further comprising maintaining the braking pressure below a threshold braking pressure.

19. The method of claim 15, further comprising maintaining a resistance between at least two braking surfaces of the vehicle braking system below a threshold resistance.

20. A non-transitory computer readable storage medium comprising instructions thereon that, when executed, configure one or more processors to perform operations comprising:
accessing sensor data indicating an environment in which an autonomous vehicle is located;
estimating, using the sensor data, a particular object in the environment;

determining an accuracy of the estimating of the particular object; and increasing a braking pressure of a vehicle braking system of the autonomous vehicle to a first braking pressure, the first braking pressure being determined based on the accuracy of the estimating of the particular object.

\* \* \* \* \*